2,590,020

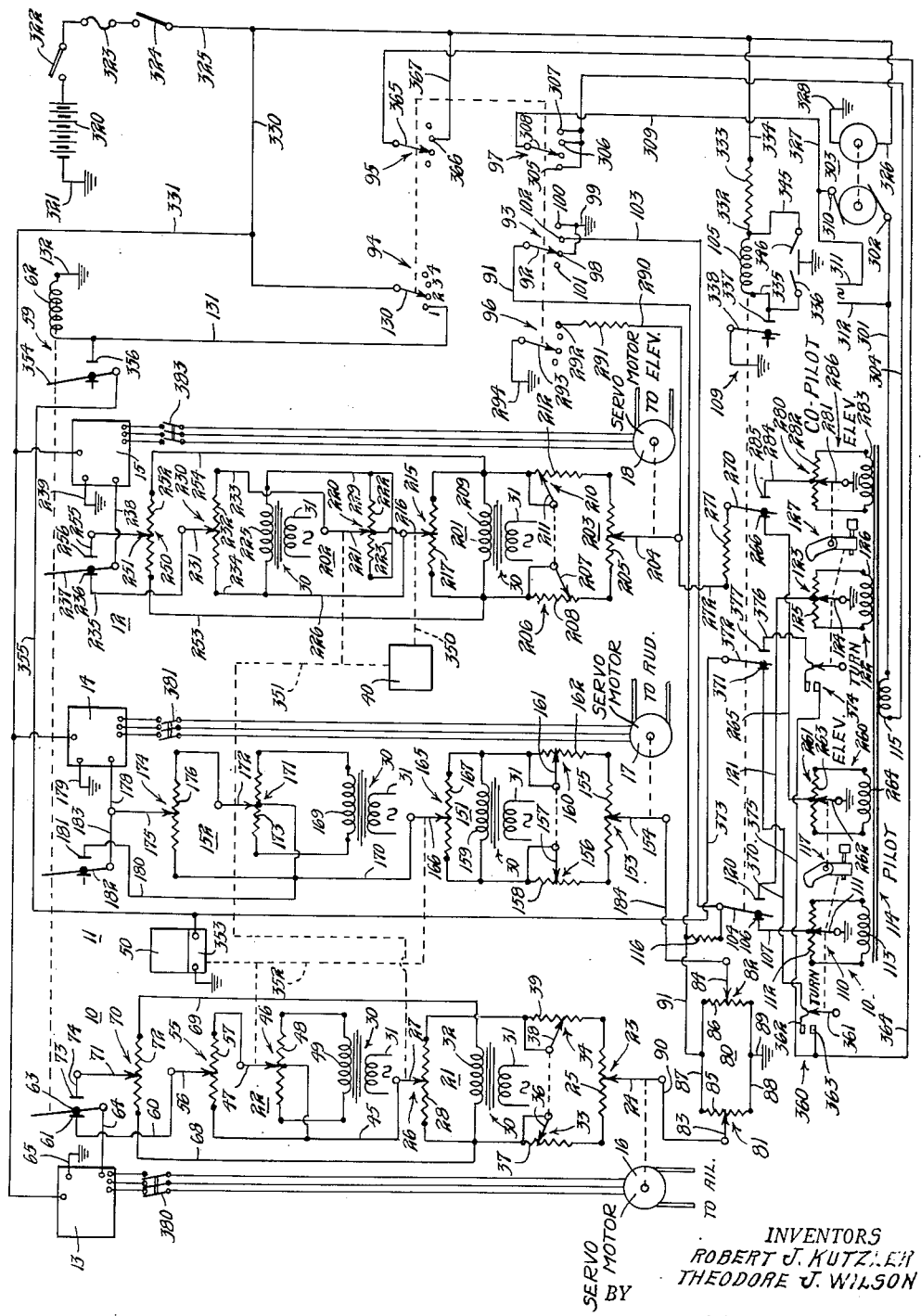
March 18, 1952  R. J. KUTZLER ET AL  2,590,020
AUTOMATIC PILOT
Filed June 27, 1945
INVENTORS
ROBERT J. KUTZLER
THEODORE J. WILSON
BY
George H. Fisher
ATTORNEY Patented Mar. 18, 1952

UNITED STATES PATENT OFFICE 2,590,020

AUTOMATIC PILOT

Robert J. Kutzler and Theodore J. Wilson, Minneapolis, Minn., assignors to Minneapolis-Honeywell Regulator Company, Minneapolis, Minn., a corporation of Delaware Application June 27, 1945, Serial No. 601,816

25 Claims. (Cl. 244—77)

Our invention relates generally to control systems and more particularly to motor operated control systems for aircraft wherein a crew member is provided with a manually operable means which may be used by him to control the operation of the motors and thereby control the aircraft in any one of several different manners.

It is customary for aircraft to be provided with manually operable means, such as the well known "stick," which operates the control surfaces directly by means of cables. In addition, when a control system of the motor operated type is used to control the position of the control surfaces, it is often desirable to have a manually operable controller which may be used to control the operation of the motors; and it is this latter type of controller which is meant when we refer to a "manual controller," unless the other is clearly intended.

In a previous application Serial No. 570,712, filed December 30, 1944 now patent 2,471,821 dated May 31, 1949, by the present inventors, a manually operable control device for this purpose was shown and described, and a control system was shown which is suitable for use with that device. We have found that certain additional features are desirable in such a control system, and these features, relating more to the control of the control system, are shown and described in this present application. The manual controller used with this system may be either the type shown in our previous application or may be of the type shown in the application Serial No. 601,813 of Arthur S. Osborne now patent 2,481,776 dated September 13, 1949, filed the same date as this.

As shown in our previous application mentioned above, it is often desirable to have a manual control means available for use in conjunction with an automatic pilot so that the main control of the aircraft is provided by the automatic pilot, while changes in the path maintained by the automatic pilot may be provided by the manual control means. However, it is often desirable to be able to control the control surfaces of the aircraft directly and not indirectly, as through the autopilot, in some cases where very precise control must be exercised as, for example, where an aircraft is in close proximity to other aircraft. In such cases it is very convenient to be able to use the servo motors of the autopilot system to operate the control surfaces, thereby relieving the pilot of the physical effort necessary to do this; and at the same time it is desirable for the pilot to be able to control the surfaces directly without the compensating or opposing effect of the gyroscope usually found in such autopilots.

In other cases it is desirable for the pilot to be able to control the elevation of the aircraft very accurately while at the same time permitting the autopilot to control the course of the plane, as for example in the case of aerial photographic mapping where it is quite important that the altitude remain constant despite updrafts or downdrafts in the atmosphere, while the autopilot flies the predetermined course.

Since the servo motors, manual control means, and other devices necessary to produce these results are present in the control system disclosed in our previous application, it will be very convenient if means may be provided whereby the various elements may be connected to form a control system having any of the desired characteristics.

It is therefore a major object of our invention to provide a control system which may be used in conjunction with an autopilot in an aircraft to provide operation of the control surfaces of the aircraft in accordance with the demands of the autopilot system as modified by the use of the manual control means, or to provide operation of the control surfaces in accordance with the movement of the manual control member without the counteracting effect of the gyroscopically or similarly stabilized members of the autopilot.

It is another object of our invention to provide a control system for an aircraft which has a manually operated control means normally effective to cause the previously mentioned servo motors to position the control surfaces of the aircraft and change its angular position about either or both of two axes, but which may be instantaneously changed to render control about one of these axes ineffective.

It is a further object of our invention to provide a control system of the class described having a manual control means normally effective to cause the angular position of said aircraft about either or both of two axes to be varied, the control system being capable of rendering the operation of said manual controller ineffective to change the angular position of said aircraft about one axis, and materially reducing the effectiveness of the controller in the other plane.

It is still another object of our invention to provide a control system having four different types of control, the types being that in which the autopilot may be used alone with the manual control means wholly ineffective to modify the operation of the autopilot; that in which the autopilot may be used with the manual control means effective to modify the operation thereof to change the angular position of the aircraft about three axes; that in which the autopilot may be used to control the position of the aircraft about three axes while the manual control means is ineffective to modify the operation of the autopilot about two of these axes and is effective, to a reduced degree, to modify the operation of the autopilot about the third axis; and that in which the operation of the autopilot as such is rendered ineffective and the manual control means is effective to control the angular position of the aircraft about three axes.

These and other objects of our invention will become apparent from the following description of a preferred form thereof and from the drawing illustrating that form in which the single figure is a schematic wiring diagram of a control system incorporating our invention.

Referring now to the drawing, it will be seen that there are three control networks 10, 11, and 12, designated aileron, rudder, and elevator networks, respectively. The networks 10, 11, and 12 have output terminals connected to amplifiers 13, 14, and 15, respectively, and these in turn are connected to servo motors 16, 17, and 18, respectively, which in turn are connected by cables to the ailerons, rudder, and elevator (not shown) of the aircraft. It is to be understood that we do not claim the amplifiers 13, 14, and 15 or the servo motors 16, 17, and 18 as our invention, since such amplifiers and motors are well known in the art and may be of a type such as that shown in the patent to Whitman No. 1,942,587 or to Anschutz-Kaempfe No. 1,586,233.

As shown in the drawing, the network 10 includes a bridge 21 and a voltage dividing network 22 connected in series therewith; and the output of these two is connected to the amplifier 13 to operate the servo motor 16.

Bridge 21 includes a rebalancing potentiometer 23 having a wiper 24 which bears against a resistor 25, and a control potentiometer 26 having a wiper 27 which bears against a resistor 28. The resistors 25 and 28 are connected in parallel, and a source of power, such as a transformer 30 having a primary winding 31 and a secondary winding 32, is connected to the resistors so that the customary Wheatstone bridge results, with the wipers 24 and 27 forming the output terminals thereof.

For the purposes which will become apparent later, it is often desirable to change the point on the resistor 25 of the potentiometer 23 at which the wiper 24 must be located in order to balance the bridge. For this purpose, we provide a pair of centering potentiometers 33 and 34 connected in series with the rebalancing potentiometer 23 so that electrical energy flowing from the secondary winding 32 of the transformer 30 flows, for example, from the left-hand side of the winding 32, through the centering potentiometer 33, through the rebalancing potentiometer 23, through the centering potentiometer 34, and back to the right-hand side of the secondary winding. Potentiometer 33 includes a wiper 36 which bears against a resistor 37, and potentiometer 34 has a wiper 38 which bears against a resistor 39. Wiper 36 is electrically connected to one end of the resistor 37 and wiper 38 is similarly connected to one end of resistor 39; and as a result, as the wipers are moved from the ends of the resistors to which they are electrically connected, the resistors are progressively shorted. Resistors 37 and 39 have equal resistance values, and wipers 36 and 38 are mechanically connected together so that when the wipers are moved, the shorted portion of one resistor is increased and the shorted portion of the other resistor is simultaneously decreased. As a result, the total resistance in the series circuit measured from one end of the secondary 32 of the transformer 30 through the potentiometers 33, 23, and 34 remains a constant as the wipers 36 and 38 are moved, while the point at which wiper 24 must be located to balance the bridge for a given position of wiper 27 will vary as the wipers 36 and 38 are moved. The rebalancing potentiometer 23 is operated by the servo motor 16, the wiper 24 of the potentiometer being positioned by the output shaft of the servo motor; and the potentiometer 26 is operated by a means which is responsive to the angular position of the aircraft in a plane passing athwartships of the craft. The responsive means 40 will usually take the form of a gyroscope having its axis vertical, but any other suitable means may be used if this seems desirable.

From wiper 27 of potentiometer 26, connection is made to the voltage dividing network 22 by means of conductor 45. The network 22 includes a potentiometer 46 having a wiper 47 which bears against a resistor 48, and the latter is in turn connected to a source of power such as a secondary winding 49 of the transformer 30 having a primary winding 31. The conductor 45 is connected to the center tap of the resistor 48; and the wiper 47, which is operated by an azimuth responsive instrument 50 such as a directional gyroscope, is connected to a voltage dividing potentiometer 55. The potentiometer 55 includes a wiper 56 which bears against a resistor 57, and one end of this resistor is connected to the wiper 47, while the other end of the resistor is connected to the conductor 45.

It will thus be seen that whenever the wiper 47 is displaced from the center tap of the resistor 48, a voltage will appear between the wiper and the center tap, and this voltage will be applied across the resistor 57. Since one end of resistor 57 is connected to conductor 45, when wiper 56 is at that end of resistor 57, none of the voltage between the opposite end of resistor 57 and conductor 45 will appear between wiper 56 and conductor 45. Similarly, when wiper 56 is at the opposite end of resistor 57, all of the voltage appearing between the ends of resistor 57 will appear between wiper 56 and conductor 45. In this way, potentiometer 55 provides a means for controlling the amount of the voltage developed between wiper 47 and conductor 45 which appears between wiper 56 and conductor 45, and therefore controls the effectiveness of the azimuth responsive instrument 50. From wiper 56, connection is made by conductor 60 to a fixed terminal 61 of a "servo" relay 59 having an operating coil 62 which is normally in its deenergized condition. When the relay is deenergized, a movable contact 63 of the relay bears against the "out" contact 61, and the latter is connected through the movable contact and a conductor 64 to one of the input terminals of amplifier 13, the other terminal of which is grounded at 65.

From the terminals of the secondary 32 of the transformer 30 in bridge 21, a pair of conductors 68 and 69 lead to a trimmer potentiometer 70, having a wiper 71 which bears against a resistor 72. The conductors 68 and 69 are connected to opposite ends of resistor 72, thus connecting it in parallel with resistor 28 of potentiometer 26; and the wiper 71 is connected to an "in" contact 73 of servo relay 59 by conductor 74.

It is thus seen that when the operating coil 62 of the servo relay 59 is deenergized, the amplifier 13 is connected through the movable contact 63 and the "out" contact 61 to the network 22, and hence it is connected to the gyroscopically operated potentiometers 46 and 26. When the operating coil 62 is energized, the amplifier 13 is connected through the movable contact 63 and the "in" contact 73 to the bridge 21 in such a manner that the gyroscopically operated potentiometers 46 and 26 will have no effect upon any signal which the amplifier 13 is receiving.

Shown below the network 10 is an adjusting network 80 which includes a pair of potentiometers 81 and 82 each having a wiper 83 and 84, respectively, which bear against resistors 85 and 86, respectively. The resistors 85 and 86 are connected in parallel by conductors 87 and 88, and conductor 88 is grounded at 89. Wiper 24 of potentiometer 23 in bridge 21 is connected by conductor 90 to wiper 83 of the potentiometer 81, and conductor 87 of the adjusting network 80 is connected by conductor 91 to the switch blade 92 of a switch 93.

Switch 93 is one of a plurality of switches 94, 95, 96, and 97 which are ganged or otherwise connected together for simultaneous operation. These switches are selectively adjustable to any one of four positions, and these positions are numbered at switch 94. It will be seen that the switches are in position 2, and it will be seen that in this position, switch blade 92 of switch 93 bears against a contact 98 which is grounded at 99. In position 4, switch blade 92 bears against contact 100 which is also grounded at 99; and in position 1, switch blade 92 bears against contact 101 which is not otherwise connected.

In position 3, switch blade 92 bears against contact 102 which is connected by conductor 103 to a movable contact 104 of a transfer relay 109. The transfer relay 109 has an operating coil 105, and when the coil is in its normal or deenergized condition, the movable contact 104 bears against an "out" contact 106 from which connection is made by conductor 107 to a turn control network 108.

The turn control network 108 includes a potentiometer 110 having a grounded wiper 111 which bears against a center tapped resistor 112. The resistor 112 is connected to a suitable source of power such as the secondary winding 113 of a transformer 114 having a primary winding 115. The conductor 107 is connected to the center tap of the resistor 112, and thus as wiper 110 is moved away from the center tap, a voltage will appear between conductor 107 and ground. The potentiometer 110 may conveniently be one of the potentiometers included in a control device 117, such as that disclosed in the copending application of Arthur Osborne previously mentioned. To complete the circuit, a resistor 116 is connected between conductors 91 and 103 so that when switch blade 92 of switch 93 is in position 1 and bearing against contact 101, connection is made from movable contact 104 of the transfer relay 109 to the adjusting network 80 through resistor 116.

When the operating coil 105 of transfer relay 109 is energized, the movable contact 104 bears against an "in" contact 120 which is connected by conductor 121 to a network 122 identical in all respects with network 108. The network 122 includes a potentiometer 123 having a grounded wiper 124 which bears against a center tapped resistor 125. The latter is connected to a secondary winding 126 of the transformer 114, and conductor 121 is connected to the center tap of resistor 125. Like potentiometer 110, potentiometer 123 may be one of the potentiometers in a control device 127, such as that of Osborne previously mentioned; and it will be apparent that when operating coil 105 is energized, movement of wiper 124 away from the center tap of resistor 125 will cause a voltage to appear between movable contact 104 and ground; while under the same conditions the movement of wiper 111 of potentiometer 110 will have no effect upon the voltage appearing between the movable contact 104 and ground. When the operating coil 105 is deenergized and movable contact 104 bears against the "out" contact 106, movement of wiper 111 away from the center tap of resistor 112 will cause a voltage to appear between movable contact 104 and ground; and the movement of wiper 124 of potentiometer 123 will be ineffective to change this voltage. If the pilot of the aircraft is provided with a control device 117 and the copilot of the aircraft is provided with a similar device 127, the operating coil 105 may be utilized to transfer control from the pilot to the copilot and vice versa, the pilot having control when the coil is deenergized and the copilot having control when the coil is energized. Since the operation of network 108 is identical to that of network 122, further description and explanation will be made considering the network 108 connected to conductor 103 through "out" contact 106 and movable contact 104, though the operation and all effects would be the same if network 122 instead of network 108 were connected to the conductor 103.

As previously mentioned, when switch blade 92 of switch 93 is in position 1, no connection is made from contact 101 and conductor 91 is connected to movable contact 104 of the transfer relay 109 through resistor 116. Consequently, any voltage appearing between conductor 107 and ground is transmitted to adjusting network 80 through resistor 116, the magnitude of the voltage applied to the network 80 being reduced thereby. When switch blade 92 is in position 2, it bears against contact 98 which is grounded at 99, and conductor 91 is thereby grounded so that any voltage appearing between conductor 107 and ground is impressed across resistor 116. Conductor 91, and hence conductor 87, is at ground potential, as is conductor 88, and as a result no effect of the voltage between conductor 107 and ground is noted at network 80. In position No. 3, switch blade 92 bears against contact 102 and thereby connects conductor 91 through conductor 103 to movable contact 104, thereby shorting resistor 116. As a result, the full voltage developed by network 108 is applied to network 80 and there is no diminution of this voltage by reason of its passing through a resistor. When switch blade 92 is in position 4, it bears against contact 100 which is also grounded at 99, similarly to contact 98; and the effect of switch 93 in positions 2 and 4 is therefore the same.

From the foregoing, it may be seen that with switch blade 92 in position 3 any voltage appearing between conductor 107 and ground will be conducted to conductor 87 and there impressed across the resistors 85 and 86 of potentiometers 81 and 82, respectively. By adjusting the position of the wipers 83 and 84, any desired portion of this voltage may be selected; and from wiper 83 the voltage is transmitted by conductor 90 to bridge 21.

As previously mentioned, switch 94 is operated simultaneously with switch 93, the switch blade 130 of switch 94 is connected to a source of power, and the No. 1 contact is connected to the operating coil 62 of the servo relay 59 first described by conductor 131. The other terminal of the operating coil 62 is grounded at 132 to complete the circuit to the source of power; and thus when the switch 94 is in position 1, the operating coil of the servo relay 59 is energized and all the movable contacts, such as contact 63, are moved by it to their "in" positions.

A voltage circuit for the input to amplifier 13 may now be traced. With the switches 93 and 94 in position 1, and starting at grounded wiper 111 in the network 108, the circuit may be traced from the wiper 111 to conductor 107 and "out" contact 106, through movable contact 104 and resistor 116 to conductors 91 and 87. Any voltage appearing between conductor 91 and ground will be impressed across resistors 85 and 86 in adjusting network 80, and a portion of this voltage will appear on wiper 83 and be transmitted by conductor 90 to wiper 24 of the rebalancing potentiometer 23 in the bridge 21. From resistor 25, the circuit divides and one branch goes through potentiometer 33 and conductor 68 to one side of potentiometer 70, while the other branch goes through the potentiometer 34 and conductor 69 to the other side of potentiometer 70. From potentiometer 70, the circuit continues through the wiper 71 thereof to the "in" contact 73 of the servo relay 59, through the movable contact 63 thereof and thence to one of the input terminals of amplifier 13, the other input terminal of which is grounded at 65 to complete the circuit.

With switches 93 and 94 in position 2 as shown, the operating coil 62 of the servo relay 59 is de-energized and all the movable contacts controlled by it are in their "out" positions. Conductor 91, which is connected to switch blade 92, is grounded through contact 98 at 99, and hence any voltage which appears between conductor 107 and ground is impressed across resistor 116 and has no effect upon adjusting network 80. Since conductor 91 is grounded, conductor 87, to which it is connected, is likewise grounded, as is conductor 88; and wiper 83 of potentiometer 81 is therefore at ground potential, as are conductor 90 and wiper 24 of potentiometer 23 in network 21. From wiper 24, the circuit may be traced through resistor 25, potentiometers 33 and 34, potentiometer 26 and wiper 27 thereof to conductor 45, and then through potentiometer 46 of voltage dividing network 22, to one side of potentiometer 55, the other side of which is connected to conductor 45. From wiper 56 of potentiometer 55, connection is made through conductor 60 to the "out" contact 61 of the servo relay, then through movable contact 63 thereof to conductor 64 through amplifier 13, returning to ground at 65.

With switches 93 and 94 in position 3, operating coil 62 of servo relay 59 is deenergized, permitting movable contact 63 to bear against fixed contact 61 and resistor 116 is shorted by switch 93; and hence starting at grounded wiper 111, the circuit may be traced through conductor 107 to "out" contact 106 of the transfer relay 109, through movable contact 104 and conductor 103 to contact 102 and switch blade 92 of switch 93 and then through conductor 91 to conductor 87. From conductor 87 the circuit may be traced through potentiometer 81 and the wiper 83 thereof to conductor 90 and wiper 24 of potentiometer 23 of the bridge circuit 21. From there it continues through potentiometers 33 and 34 to potentiometer 26 and the wiper 27 thereof to conductor 45 and through potentiometers 46 and 55, as previously described, to wiper 56, "out" contact 61, movable contact 63, and conductor 64 to amplifier 13, from whence it returns to ground 65 and back to the grounded wiper 111.

With switches 93 and 94 in position 4, switch blade 92 is grounded through contact 100 at 99; and hence conductor 91 is grounded as it was when the switches 93 and 94 were in position 2. The remainder of the circuit is likewise identical with that prevailing when the switches were in position 2 and hence will not be repeated here.

It will be seen that network 11 includes a bridge 151 and a voltage dividing network 152. Included in bridge 151 is a rebalancing potentiometer 153 having a wiper 154 which bears against a resistor 155 and which is positioned by motor 17. One end of resistor 155 is connected through a potentiometer 156, which has a wiper 157 bearing against a resistor 158, to one terminal of a source of power such as a secondary winding 159 of a transformer 30 having a primary winding 31. The other end of resistor 155 is connected through a potentiometer 160, similar to potentiometer 156, and having a wiper 161 bearing against a resistor 162, to the opposite end of the secondary winding 159. Wiper 157 of potentiometer 156 is connected to one end of the resistor 158 so that as the wiper is moved along the resistor, more or less of the resistor is shorted. Similarly, wiper 161 is connected to one end of resistor 162 so that as this wiper is moved along its resistor, more or less of the resistor is likewise shorted. The wipers 157 and 161 are mechanically connected together so that as one wiper is moved to short less of its resistor, the other wiper is moved to short more of its resistor; and thus as the wipers 157 and 161 are moved, the resistance from one end of secondary winding 151 through potentiometer 156, potentiometer 153, and potentiometer 160 to the other end of the secondary winding 159 remains a constant. To complete the bridge, a potentiometer 165, which has a wiper 166 bearing against a resistor 167, is connected so that its resistor is connected to the terminals of the secondary winding 159. It will thus be seen that a Wheatstone bridge is provided, with wipers 154 and 166 forming the output terminals thereof. Wiper 154 is operated by the servo motor 17, and wiper 166 is operated by the azimuth responsive instrument 50.

From wiper 166, connection is made to network 152 by conductor 170. Included in network 152 is a potentiometer 171 having a wiper 172 which bears against a resistor 173, the ends of which are connected to a secondary winding 169 of a transformer 30 having a primary winding 31. Conductor 170 is connected to the center tap of resistor 173, and the output of potentiometer 171, as measured between the center tap and wiper 172, is applied to a voltage dividing potentiometer 174 having a wiper 175 which bears against a resistor 176, one end of which is connected to wiper 172 and the other end of which is connected to conductor 170. From wiper 175, connection is made by conductor 178 to one of the input terminals of amplifier 14, the other input terminal of which is grounded at 179. In addition to these connections, connection is made by conductor 180 from conductor 170 to another terminal of the servo relay 59, the conductor 180 being connected to an "in" contact 181 which is engaged by a movable contact 182 when the operating coil 62 is energized. From movable contact 182, connection is made to conductor 178 by conductor 183; and thus when the servo relay 59 is energized, the voltage divider bridge 152 is shorted by the contacts 181 and 182.

Wiper 154 of the rebalancing potentiometer 153 in the bridge 151 is connected by conductor 184 to wiper 84 of the potentiometer 82 in the adjusting network 80. Potentiometer 82 performs a function similar to that performed by potentiometer 81, namely, the securing of the desired portion of the voltage appearing between conductor 87 and ground and transmitting that portion of the voltage to the bridge 151.

A voltage circuit for the input of the amplifier 14 may now be traced. With the selector switches 93 and 94 in No. 1 position, starting at grounded wiper 111 in the network 108, the circuit may be traced through conductor 107, "out" contact 106, movable contact 104 of the transfer relay 109, through resistor 116 to conductor 91, and then to conductor 87 as previously described. From conductor 87, the circuit continues through a portion of resistor 86 of the potentiometer 82, through the wiper 84 thereof and conductor 184, to wiper 154 of the potentiometer 153 in bridge 151. From wiper 154 the circuit may be traced through resistor 155 of the potentiometer 153, through potentiometers 156 and 160 and resistor 167 of potentiometer 165, to the wiper 166 thereof. From wiper 166, connection is made through conductor 170, conductor 180 to "in" contact 181 of the servo relay 59 and movable contact 182 thereof (relay 62 being energized with switch 94 in No. 1 position), through conductors 183 and 178 to one of the input terminals of amplifier 14, the other terminal of which is grounded at 179 to complete the circuit.

When switches 93 and 94 are in position No. 2, switch blade 92 is in engagement with contact 98 which is grounded at 99, and hence conductor 91, connected to switch blade 92, is grounded, thereby placing both conductors 87 and 88 at ground potential. Wiper 84 of potentiometer 82 is therefore at grounded potential, as is conductor 184 and wiper 154 of the rebalancing potentiometer 153. From potentiometer 153 the circuit may be traced through potentiometers 156 and 160 and through resistor 167 of potentiometer 165 and through the wiper 166 thereof. From wiper 166, connection is made by conductor 170 through potentiometer 171 and wiper 172 thereof to one side of resistor 176 of potentiometer 174, the other side of which is connected to potentiometer 170. From wiper 175, connection is made by conductors 177 and 178 to the input of amplifier 14, the other input terminal of which is grounded at 179 to complete the circuit.

With switches 93 and 94 in position No. 3, the input circuit may be traced from the grounded wiper 111 of the network 108 to conductor 107, through "out" contact 106 and movable contact 104 of transfer relay 109 to conductor 103 and contact 102 and then to switch blade 92 and conductor 91 to conductor 87. From conductor 87, the circuit continues through resistor 86 of potentiometer 82, and the wiper 84 thereof to conductor 184 and wiper 154 of rebalancing potentiometer 153. From potentiometer 153 the circuit continues through potentiometers 156 and 160 to the resistor 167 of potentiometer 165 and to the wiper 166 thereof. From wiper 166 connection is made by conductor 170 to one side of the resistor 176 of potentiometer 174, and also to potentiometer 171, the wiper of which is connected to the opposite end of resistor 176. From wiper 175 of potentiometer 174, the circuit is continued through conductors 178 and 177 to one of the input terminals of amplifier 14, the other input terminal of which is grounded at 179 to complete the circuit.

With switches 93 and 94 in position 4, the voltage circuit for the input of amplifier 14 is the same as that traced when the switches are in position 2, and hence it will not now be repeated.

Elevator network 12 includes a bridge 201 and a voltage dividing network 202. Included in bridge 201 is a rebalancing potentiometer 203 having a wiper 204 which bears against a resistor 205. One end of resistor 205 is connected through a potentiometer 206, having a wiper 207 bearing against a resistor 208, to one terminal of a suitable source of power such as a secondary winding 209 of a transformer 30 having a primary winding 31. The other end of resistor 205 is connected through a potentiometer 210, having a wiper 211 which bears against a resistor 212, to the other terminal of the secondary winding 209. Wiper 207 is connected to one end of resistor 208 and wiper 211 is connected to one end of resistor 212, so that as these wipers are moved across their respective resistors, more or less of the resistor will be shorted. Wipers 207 and 210 are mechanically connected together in such a manner that as more of one resistor is shorted, less of the other resistor is shorted; and thus the total resistance from one terminal of the secondary winding through potentiometers 206, 203, and 210 to the other terminal of the secondary winding remains a constant as the wipers 207 and 210 are varied.

To complete the bridge circuit, a potentiometer 215, having a wiper 216 which bears against a resistor 217, is connected so that the ends of the resistor are connected to the terminals of the secondary winding 209. A Wheatstone bridge, similar to bridges 21 and 151, is thus provided with wipers 204 and 216 forming the output terminals thereof. Wiper 204 is connected to and positioned by servo motor 18, and wiper 216 is positioned by the vertical gyroscope 40 in a manner hereinafter described.

Network 202 includes a center tapped potentiometer 220 having a wiper 221 which bears against a resistor 222, the opposite ends of which are connected together by a conductor 223. The ends of the resistor 222 are connected by conductor 224 to one terminal of a suitable source of power such as a secondary winding 225 of a transformer 30 having a primary winding 31. The center tap of the resistor 222 is connected by a conductor 226 to the other terminal of the secondary winding 225. An adjusting potentiometer 230, which has a wiper 231 bearing against a resistor 232, has one end of the resistor connected by conductor 233 to wiper 221 of potentiometer 220, and the other end of the resistor 232 is connected by conductor 234 to conductor 226. Wiper 221 is operated by the vertical gyroscope 40 in a manner hereinafter described, and conductor 226 is connected to wiper 216 of the potentiometer 215 in the bridge circuit. Wiper 231 of potentiometer 230 is connected by conductor 235 to an "out" contact 236 of the servo relay 59; and movable contact 237 of that relay, which may make connection with contact 236, is connected by conductor 238 to one of the input terminals of amplifier 15, the other terminal of which is grounded at 239.

Connected in parallel with potentiometer 215 in the bridge 201 is a potentiometer 250 having a wiper 251 which bears against a resistor 252. One end of resistor 252 is connected by conductor 253 to one end of secondary winding 209, while the other end of resistor 252 is connected by conductor 254 to the opposite end of transformer 209. Wiper 251 is connected by conductor 255 to "in" contact 256 of the servo relay 59 and hence may be contacted by movable contact 237 to connect wiper 251 to amplifier 15 through conductor 238.

To complete the elevator circuit, a network 260, comparable to the network 108, is provided which includes a potentiometer 261 having a grounded wiper 262 bearing against a center tapped resistor 263. The ends of the resistor 261 are connected to a suitable source of power such as the secondary winding 264 of transformer 114; and the center tap of the resistor is connected by conductor 265 to an "out" contact 266 of the transfer relay. When the operating coil 205 of the transfer relay 109 is deenergized, a movable contact 270 of that relay bears against the "out" contact 266. Movable contact 270 is connected to one end of a resistor 271, the other end of which is connected by conductor 272 to wiper 204 of rebalancing potentiometer 203 in bridge 201.

As previously described, the potentiometer 110 in the network 108 is preferably one of the potentiometers included in the control device 117 which may be of the type disclosed in the Osborne application previously mentioned. In this application, there is disclosed a second potentiometer which may be simultaneously and independently operated while operating the first potentiometer 110. This second potentiometer may be used as potentiometer 261 in the network 260; and the dotted lines connecting controller 117 with potentiometer 261 and with potentiometer 110 indicate that these potentiometers are controlled by the control device and are capable of simultaneous and independent operation. As previously mentioned, the pilot of the aircraft is provided with a control device 117, and the copilot is provided with a similar control device 127. Since the control devices 117 and 127 are identical, control device 127, in addition to having the potentiometer 123 previously described, also has a potentiometer 280 having a grounded wiper 281 which bears against a center tapped resistor 282. The ends of resistor 282 are connected to a source of power such as a secondary winding 283 of transformer 114 to form a network 286; and the center tap of the resistor is connected by conductor 284 to "in" contact 285 of the transfer relay 109 which may be contacted by the movable contact 270. As wiper 281 is displaced from the center position, a voltage will appear between conductor 284 and ground 281 and this voltage will be transmitted to the "in" contact 285. Similarly, when wiper 262 is displaced from center position along resistor 263, a voltage will be developed between conductor 265 and ground. However, only one of these voltages will be applied to resistor 271, and this voltage will be determined by the position of the transfer relay 109. Since both network 260 and network 286 are identical and since only one of the networks may be connected to resistor 271 at any given time, in the description which follows it will be assumed that network 260 is connected to resistor 271 through "out" contact 266 and movable contact 270.

To complete the circuit associated with the input of the elevator amplifier 15, a conductor 290 is connected from conductor 272 to a resistor 291, the other end of the latter being connected to a fixed contact 292 located at position 4 in switch 96. The switch blade 293 of switch 96 is grounded at 294; and thus when switch 96 is in position 4, conductor 272 and wiper 204 of potentiometer 203 are grounded through resistor 291. Under these conditions, any voltage appearing between movable contact 270 of the transfer relay 109 and ground will be impressed across resistors 271 and 291 in series; and these resistors will act in the manner of the well known voltage divider to determine the voltage of wiper 204 with respect to ground.

A voltage circuit for the elevator amplifier 15 may now be traced. Starting at grounded wiper 262 of network 260, and with switches 94 and 96 in position 1, the circuit may be traced through potentiometer 261 to conductor 265, "out" contact 266 and movable contact 270 of the servo relay, resistor 271, conductor 272, and wiper 204 to resistor 205 of the rebalancing potentiometer 203 in bridge 201. From one side of resistor 205, connection is made through potentiometer 206 and conductor 253 to one end of resistor 252 of potentiometer 250. From the other end of resistor 205, connection is made through potentiometer 210 and conductor 254 to the opposite end of resistor 252. From potentiometer 250, connection is made through wiper 251 thereof and conductor 255 to "in" contact 256 of the servo relay 59 and from there through movable contact 237 and conductor 238 to one of the input terminals of amplifier 15 and then through the other input terminal to ground 239.

With switches 94 and 96 in position No. 2, the circuit may be traced from grounded wiper 262, through potentiometer 261 and conductor 265 to contact 266 of the transfer relay 109 and then through movable contact 270 thereof, through resistor 271 and conductor 272 to wiper 204 of the rebalancing potentiometer 203. From potentiometer 203 the circuit continues through potentiometers 206 and 210 to potentiometer 215 of bridge 201, from whence connection is made by wiper 216 to conductor 226. Conductor 226 is connected through conductor 234 to one end of resistor 232 of potentiometer 230, the other end of which resistor is connected through conductor 233 and potentiometer 220 to conductor 226. From potentiometer 230, connection is made by wiper 231 thereof and conductor 235 to contact 236 of the servo relay 59; and from there the circuit continues through movable contact 237 and conductor 238 to one of the input terminals of amplifier 15, the other input terminal of which is grounded at 239 through which the circuit is completed back to grounded wiper 262.

With switches 94 and 96 in position 3, the voltage circuit for the input of the elevator amplifier 15 is identical with that just described when the switches are in position 2, and that description will not be repeated here.

With switches 94 and 96 in position 4, the circuit may be traced from grounded wiper 262 of network 260 through potentiometer 261 thereof and conductor 265 to "out" contact 266 and movable contact 270 of the transfer relay 109. From movable contact 270, one circuit may be traced through resistor 271, conductor 272, conductor 290, resistor 291, contact 292, and switch blade 293 to ground 294 and thence back to grounded wiper 262. An additional circuit may be traced through resistor 271 and conductor 272 to wiper 204 of the rebalancing potentiometer 203 in the bridge 201. From potentiometer 203 the circuit continues through potentiometers 206 and 210 to potentiometer 215, and then through wiper 216 thereof to conductors 226 and 234 to one connection of potentiometer 230, the other connection of which is connected through potentiometer 220 to wiper 216. From potentiometer 230, connection is made by wiper 231 and conductor 235 to "out" contact 236 of the servo relay 59, from which the circuit is completed through movable contact 237, conductor 238, the input circuit of amplifier 15, and ground 239 to grounded wiper 262.

It will be noted that in the description just preceding, the elevator circuit is similar in all respects with switches 94 and 96 in position 2 and in position 3. It will later be shown that it is undesirable for any voltage to be developed between wiper 262 and conductor 265 no matter how far the wiper is displaced from the center tap, when switches 94 and 96 are in position 2. To prevent such a voltage from appearing, the primary winding 115 of the transformer 114 which provides the energization for all of the networks 108, 122, 260, and 280, is connected to a switch 97, one of the series of ganged switches, in such a manner that the primary winding 115 is not energized when the switches are in position 2, but is energized when the switches are in position 1, 3, or 4.

To do this, one of the terminals of the primary winding 115 is connected by conductor 301 to one of the output terminals 302 of an inverter 303; and the other terminal of the primary winding is connected by conductor 304 to contacts 305, 306, and 307 of switch 97, corresponding to positions 1, 3, and 4 of the ganged switches. Switch blade 308 of switch 97 is connected by conductor 309 to the other output terminal 310 of the inverter 303; and thus when switch 97 is in position 1, 3, or 4, the transformer 114 will be energized and a voltage will be impressed across the resistors in the bridges 108, 122, 260, and 280. The transformer 30, shown with different secondaries as appearing in bridges and networks 21, 22, 151, 152, 201, and 202, is connected directly to the output terminal of inverter 303 by conductors 311 and 312 which, however, for the sake of clarity, are not shown as connecting to each representation of primary 31.

Power for this control system is supplied from batteries 320 in the aircraft, or by a generator (not shown), one terminal of which is grounded at 321, and the other terminal of which is connected to the master switch 322 of the aircraft. From switch 322, power is usually taken through a fuse 323 to the control system master switch 324; and from the latter, a conductor 325 carries power to one of the input terminals 326 of the inverter 303, the other input terminal 327 of which is grounded at 328. Conductor 330 connects conductor 325 to switch blade 130 of switch 94, thereby providing the power to energize the coil 62 of the servo relay as previously described; and a conductor 331, connected either to conductor 330 or to conductor 325, furnishes power to amplifiers 13, 14, and 15, the current returning through the ground connections 65, 179, and 239 previously mentioned and shown in conjunction with the input circuits of these respective amplifiers.

To operate the transfer relay 109, the coil 105 is connected by conductor 332 to resistor 333, and the other terminal of this resistor is connected by conductor 334 to conductor 325. The opposite terminal of coil 105 is connected by conductor 335 to a push button switch 336 which is grounded. Conductor 335 is also connected to an "in" contact 337 of the relay, which is contacted by grounded movable contact 338 when the coil 105 is energized. When switch 336 is momentarily closed, the circuit through coil 105 is completed and all the movable contacts associated with the relay are moved so as to bear against the "in" contacts. Under these conditions, the circuit through coil 105, which was originally completed through switch 336, is also completed through contacts 337 and 338; consequently, when the switch 336 is then released, the coil 105 remains energized through contacts 337 and 338. To deenergize the coil 105, conductor 345 is connected to conductor 332 and to a push button switch 346 which, when closed, grounds conductor 345. When this is done, coil 105 is shorted and the full voltage of the source 320 is applied between the ends of resistor 333. When coil 105 is shorted, the movable contacts operated by it move to their "out" position, and upon releasing the switch 346, the contacts remain in that position.

Since switch 336 will cause the transfer relay 109 to move the movable contacts of the relay to the position where the copilot's control device 127 is effective to cause operation of the amplifiers 13, 14, and 15, switch 336 is located so as to be readily accessible to the copilot. Similarly, since switch 346 will insure that the movable contacts of the relay are in their "out" positions, where the pilot's control device 117 is effective to control the operation of amplifiers 13, 14, and 15, switch 346 is located so as to be convenient for his use. In addition, because of this arrangement, the pilot is able to override the copilot's control at any time he desires. For the maximum convenience, switches 346 and 336 may be mounted in the ends of the pilot's and copilot's control devices 117 and 127, respectively.

Considering now the position responsive instruments 40 and 50, the instrument 40 will generally consist of a so-called vertical gyroscope, i. e., a gyroscope whose spin axis is maintained perpendicular to the surface of the earth. Such gyroscopes are well known in the art, and we do not claim the gyroscope as such as our invention. Such a gyroscope, when mounted in an aircraft, will indicate when one wing is lower than the other, i. e., the plane has changed its angular position about its roll axis; and it may also be used to indicate when the plane is diving or climbing, i. e., when the plane has changed its angular position about its pitch axis. These, of course, are two separate axes, and separate mechanical means may be operated by the movement of the gyroscope about these two axes. In the control system illustrated, wiper 216 of potentiometer 215 in bridge 201 is connected by a mechanical linkage 350 to the position responsive device 40 in such a manner as to be moved when the plane changes its angular position about its pitch axis. Similarly, wiper 27 of potentiometer 26 in bridge 21, wiper 172 of potentiometer 171 in network 152, and wiper 221 of potentiometer 220 in bridge 202 are connected by a linkage 351 to the position responsive device 40 in such a manner that any change of the angular position of the aircraft about its roll axis will cause these wipers to be moved across their respective resistors.

The position responsive device 50 is one which is effective to measure changes in azimuth and may take the form of a horizontal or directional gyroscope or a compass of any suitable type. With this device, any change in the angular position of the aircraft in azimuth will immediately be indicated by relative movement of two members therein. This movement is used to control a linkage 352 to move wiper 47 of potentiometer 46 in the network 22 and wiper 166 of potentiometer 165 in bridge 151. As will be described hereinafter, it is the purpose of this azimuth responsive device 50 to maintain the craft in a predetermined heading, so that there is no change in its angular position in azimuth. This is usually a very desirable characteristic, but when it is desired to turn the aircraft while the latter is under the control of the system herein described, it is necessary that some means be used to hold the mechanical linkage 352 and with it the wipers 47 and 166 in their centered position so that when the turn is completed, the aircraft will then remain on the new heading. Later, it will also be seen that it is desirable that the azimuth responsive device have no control over the aircraft when the switches 93 to 97 inclusive are in position No. 1.

To hold the linkage 352 in centered position under any of these conditions, we have placed a so-called locking means 353 between the azimuth responsive device 50 and the linkage 352. This locking device forms no part of our present invention and may be merely a magnetically operated brake which engages the mechanical linkage 352 while a clutch permits the responsive member of the azimuth responsive device to slip with respect to the linkage 352. While this system works very satisfactorily, many other suitable systems are available.

To energize the lock 353 when the switches 93 to 97 inclusive are in position No. 1, a movable contact 354 of the servo relay 59 is connected by conductor 355 to one of the input terminals of the locking device 353, the other terminal of which is grounded. When operating coil 62 of the servo relay is energized, movable contact 354 is moved into engagement with "in" contact 356 and is thereby connected to conductor 131 which is simultaneously energizing coil 62.

When wiper 111 of potentiometer 110 in the network 108 is displaced from the center tap of resistor 112, it will later be shown that the aircraft tends to turn. Under these conditions, it is desirable to have the linkage 352 locked in center position so that it will not be moved by the azimuth responsive instrument 50 as the aircraft turns. To operate the locking means 353, a switch 360 is incorporated in the control device 117 so that any time wiper 111 is displaced from center position, the contacts of the switch are closed. This is indicated in the drawing by the pointer-like member 361 which is mechanically connected to the wiper 111, and which bears against a spring leaf contact 362 to urge the latter away from the other contact 363 of the switch 360. Contact 363 is connected by conductor 364 to the switch blade 365 of switch 95; and when the latter is in position No. 3, it bears against a contact 366 which is connected by conductor 367 to conductor 325. Contact blade 362 is connected by conductor 370 to an "out" contact 371 of the transfer relay 109; and the movable contact 372 associated therewith is connected by conductor 373 to operate the locking mechanism 353.

A similar switch 374 is provided in the copilot's control device 127, and one of its contacts is connected by conductor 375 to contact 363 of the pilot's switch 360. The other contact is connected by conductor 376 to "in" contact 377 of the transfer relay 109 and is connected to conductor 373 when the operating coil 105 of the transfer relay is energized.

It will thus be seen that when the gang switches 93 to 97, inclusive, are in position 1, the locking means 353 is energized by means of the servo relay 59, and the contacts 354 and 356 thereof. When the switches are in positions 2 and 4, the locking means is not energized by the servo relay 59 or by the switches 360 or 374. However, when the switches are in position 3, the locking means 353 will be energized by the switch 360 or 374, depending upon whether the coil 105 of the transfer relay 109 is energized or not, whenever the corresponding wiper is displaced from its center position.

To prevent the operation of the servo motors 16, 17, and 18 by amplifiers 13, 14, and 15, respectively, when the operating conditions may not be satisfactory, switches 380, 381, and 382 are placed in the circuits connecting amplifiers 13, 14, and 15 to servo motors 16, 17, and 18 respectively. When any switch is open, its amplifier has no effect on its servo motor, even though a signal may be impressed upon the input circuit of the amplifier.

It is to be understood that we do not claim the amplifiers 13, 14, and 15 or the servo motors 16, 17, and 18 as our invention, nor do we claim the angular position responsive member 40 nor the direction responsive instrument 50 as included within this invention, since such amplifiers, servo motors, and responsive members are well known in the art. The patents to Whitman No. 1,942,587 and Anschutz-Kaempfe No. 1,586,233 are cited as examples of patents disclosing amplifiers and servo motors suitable for use in our control system. The application of the present inventors Serial No. 570,712, filed December 30, 1944, now Patent No. 2,471,821, shows various features of the control system described, including particularly the bridges and networks 21 and 22, 151 and 152, network 80, bridge 201 and network 202. Furthermore, the application of Arthur Osborne, previously mentioned, shows the design and construction of control devices that may be use as control devices 117 and 127 previously described. The subject matter of this application is not claimed as part of this invention except insofar as they combine and cooperate with other portions of the circuit described to produce new and useful functions as particularly pointed out in the claims.

*Operation*

Assume now that the craft is airborne, that switches 322 and 324 are closed, and that the ganged switches 93, 94, 95, 96, and 97 are in position 2. Switches 380, 381, and 382 are in open position and the aircraft has been trimmed by the usual manual trim tabs so that it is flying in the desired heading with its wings level and is neither gaining nor losing altitude. Under these conditions, the amplifiers 13, 14, and 15 are energized, and bridges and networks 21, 22, 151, 152, 201, and 202 are energized by their respective transformers, and transformer 114 is not energized. The mechanical linkage 352, the wiper 47 of potentiometer 46 in the network 22, and wiper 166 of potentiometer 165 in bridge 151, controlled by the azimuth responsive instrument 50, are centered and held in that position. Network 10 is then brought into a condition of balance by moving the wipers 36 and 38 of the potentiometers 33 and 34, thereby reducing the output of the amplifier 13 to zero.

In order for the wings to remain level, the ailerons must be in a definite position, and this position will be transmitted by the cables to the aileron servo motor 16 which will in turn position the wiper 24 of the potentiometer 23. Since, as previously mentioned in the description, conductor 87 of the adjusting network 80 is grounded when the ganged switches 93 to 97, inclusive, are at position 2, and since conductor 88 is grounded, wiper 24 will likewise be at ground potential. Since the plane is flying with its wings level, the vertical gyroscope 40 will operate the mechanical linkage 351 to center the wiper 27 of the potentiometer 26; and since the wiper 47 of the potentiometer 46 in network 22 has been mechanically centered, all control wipers except wiper 24 are in centered position. If wiper 24 is not centered mechanically with respect to resistor 25, it may be electrically centered by adjusting wipers 36 and 38 of potentiometers 33 and 34 until the network 10 is balanced. When it is balanced, there is no signal going to the input circuit of amplifier 13; and consequently the output circuit thereof is not energized to call for the operation of the servo motor 16. This condition may be indicated by a voltmeter, lights, or other suitable means, not shown. Under these conditions, switch 380 may be closed and the ailerons will be under the control of the automatic pilot.

The rudder network 11 is next balanced. Since the plane is flying with its wings level, wiper 172 of potentiometer 171 in bridge 152 will be centered with respect to resistor 173; and since mechanical linkage 352 has previously been centered, wiper 166 of potentiometer 165 in bridge 151 is centered with respect to resistor 167. As previously mentioned, conductor 91 is grounded through switch 93, thereby placing conductors 87 and 88 of adjusting network 80, wiper 84 of potentiometer 82, and conductor 184 and wiper 154 of the rebalancing potentiometer 153 at ground potential. The rudder has been trimmed by the manual trim tab so that it maintains the plane in the desired heading, and this position is transmitted by the cable to the rudder servomotor 17 which in turn positions the wiper 154 of the potentiometer 153. Wiper 154 may be electrically centered so as to balance the bridge 151 by adjusting the position of the wipers 157 and 161 of the potentiometers 156 and 160. When this has been done, no voltage appears between conductor 184 and ground, no voltage appears between wipers 154 and 166 of the bridge 151, no voltage appears between conductor 170 and wiper 175 in the network 152, and hence there is no voltage signal transmitted to the input of amplifier 14. There is thus no output signal from the amplifier 14 tending to cause the motor 17 to operate, which condition may be indicated by lights, a voltmeter, or other suitable means (not shown); and hence the switch 381 may be closed and the ailerons and rudder are now under the control of the autopilot. The mechanical linkage 352 is now released so that the azimuth responsive instrument 50 controls potentiometers 46 and 165.

The elevator network 12 remains to be balanced; and since the aircraft is flying with its wings level, mechanical linkage 351 has centered wiper 221 of potentiometer 220 with respect to its resistor 222. In addition, since the plane is neither diving nor climbing, mechanical linkage 350, which is operated by the vertical gyroscope 40, has substantially centered wiper 216 of potentiometer 215 with respect to resistor 217. When switch 97 is in position 2, transformer 114 is not energized, and thus no voltage appears between grounded wiper 202 and conductor 205, and hence no voltage appears between wiper 204 of rebalancing potentiometer 203 in bridge 201 and ground. In order to maintain the aircraft in level flight, the elevator has been positioned by the use of a mechanical trim tab so that the craft neither dives nor climbs; and this position is transmitted by the cable to the elevator servomotor 18 which in turn positions the wiper 204 of the potentiometer 203. If this position results in an electrical unbalance of the bridge 201, the balance may be restored by adjusting the position of wipers 207 and 211 of potentiometers 206 and 210 until no voltage is obtained between wipers 204 and 216. When this is done, since there is no voltage between wiper 204 and ground, there will be no voltage between wiper 216 and ground; and there will similarly be no voltage appearing between wiper 231 and wiper 216 and hence no voltage between wiper 231 and ground. There will thus be no voltage signal applied to the input circuit of amplifier 15, and the output circuit thereof will not be energized, which condition may be indicated by a voltmeter, lights, or other suitable means (not shown); and hence switch 382 may be closed and the ailerons, rudder, and elevator of the aircraft are now controlled by the autopilot.

With the aircraft flying under the complete control of the autopilot, any change in the angular position of the craft about any of the three axes is immediately detected and compensated for. Thus, if one wing of the aircraft drops, this change in the angular position of the craft will be detected by the vertical gyroscope 40 which will cause the linkage 351 to move wipers 27, 172, and 221 of potentiometers 26, 171, and 220, respectively. When this is done, a voltage will appear between wiper 27 and wiper 24 of bridge 21 whose phase will be determined by the direction wiper 27 is displaced relative to wiper 24; and this voltage will be transmitted through network 22 to amplifier 13, where it will cause the output circuit to be energized to operate the aileron servomotor 16 in a direction determined by the phase of the input signal which is in turn determined by the direction of movement of wiper 27. When the servomotor 16 is operated, it will reposition the ailerons and they will exert a force upon the aircraft tending to rotate it about its roll axis and return it to its original position. When the servomotor 16 is operated, it drives the wiper 24 of the potentiometer 23 in a direction tending to balance the bridge 21; and when this position of balance is reached, no further signal is transmitted to the input circuit of the amplifier 13, and the output circuits thereof are thus no longer energized and the servomotor 16 ceases rotation. The ailerons, however, are in a displaced position, and as long as they remain displaced from their original position, the aircraft will tend to turn about its roll axis. As the aircraft returns toward its original position, however, wiper 27 of potentiometer 26 is returned towards its center position by the action of the vertical gyroscope 40 and the mechanical linkage 351. As this occurs, the bridge 21 will be unbalanced in the opposite direction; and the signal sent to the amplifier 13 will thus cause the output circuits to energize the motor 16 so that it rotates in the opposite direction, thereby returning the wiper 24 towards its original position and simultaneously returning the ailerons to their original position.

When an airplane is flying with its wings level, the lift produced by these wings is substantially perpendicular to them, and hence this lift is directed vertically upward. When the plane banks or rolls about its roll axis, however, the wings are no longer level, and the lift produced by them is no longer vertical but is directed upwardly and at an angle to the vertical. This means that the vertical component is reduced, and in addition a horizontal component is introduced which tends to turn the aircraft toward the wing which is low.

To compensate for this tendency of the aircraft to turn when one wing is low, potentiometer 171 is included in the rudder network 11 and is so connected that when wiper 172 thereof is moved across resistor 173 in a direction determined by and in response to a movement of the aircraft about its roll axis, a signal whose phase is determined by the direction of movement of wiper 172 is transmitted to potentiometer 174 and thence to amplifier 14 to operate the rudder servo motor 17 in a direction tending to oppose the turning of the ship caused by one wing being low. When the servo motor 17 is operated, it moves wiper 154 of potentiometer 153 and thereby causes a voltage to appear between it and wiper 166 of bridge 151. This voltage is in such a direction or phase relationship with the voltage appearing between conductor 170 and wiper 175 as to oppose and cancel the latter; and when these two voltages are equal, no input signal is received by amplifier 14, and the operation of servo motor 17 ceases. As the aircraft returns to its original position with its wings level, wiper 172 is moved towards its original position by mechanical linkage 351 and the voltage appearing between conductor 170 and wiper 175 is thereby reduced. When this happens, the voltage appearing between wiper 154 and wiper 166 is larger; and since it is of the opposite phase to that appearing between wiper 175 and conductor 170, the amplifier 14 is energized so as to rotate the servo motor 17 in the opposite direction, thereby returning the rudder towards its original position and likewise returning wiper 154 towards its original position.

As previously mentioned, when the aircraft banks about its roll axis, the vertical component of the lift produced by the wings is reduced, and the plane therefore tends to lose altitude. This, of course, is very undesirable; and to overcome this tendency of the aircraft, wiper 221 of the potentiometer 220 in the elevator bridge 202 is moved by the mechanical linkage 351 whenever the plane is banked. As previously mentioned, the ends of resistor 222 of potentiometer 220 are connected together by conductor 223, and thus whenever wiper 221 is displaced from the center tap by the movement of linkage 351, a potential difference is produced between that wiper and conductor 226 to which the center tap is connected. Because the ends of the resistor 222 are connected together, this voltage will always be of a certain definite phase; and this phasing has been selected so that the voltage produced between wiper 221 and the center tap of the resistor is such as to cause the amplifier 15 to operate the servo motor 18 in a direction to move the elevator upwardly and increase the lift of the airplane. With this construction, it will be seen that whether the plane banks about its roll axis to either the left or the right, the signal produced by potentiometer 220 will be of the same phase and the elevator will be moved upwardly in either event.

When the elevator is moved upwardly, wiper 204 is moved by servo motor 18 to a new position so that the voltage appearing between wiper 204 and wiper 216 will be equal and opposite to that appearing between wiper 231 and conductor 226, whereupon operation of the servo motor 18 will cease. As the plane returns to its original position with its wings level, the mechanical linkage 351 will return the wiper 221 to center; and since the voltage appearing between wipers 204 and 216 will now be larger than that appearing between wiper 231 and conductor 226, the amplifier 15 will operate the servo motor 18 in the opposite direction to return the elevator to its original position.

It will thus be seen that when the plane is acted upon by air currents to cause one wing to drop, the ailerons are moved so as to restore the wings to their level position, the rudder is moved to prevent the turning of the airplane, and at the same time a certain amount of "up elevator" is applied to maintain the altitude of the plane. As the plane returns to its level position, the ailerons are returned to their original position and the rudder is likewise returned, while at the same time the amount of up elevator which was introduced during the bank is removed and the elevator returned to its original position.

Let it now be assumed that the aircraft is turned in azimuth by the action of air currents, while at the same time the wings are maintained in their original level position. Under these conditions, the azimuth responsive instrument 50 will sense this and move the mechanical linkage 352 so that wiper 47 of potentiometer 46 in the aileron bridge 22 and wiper 166 of potentiometer 165 in rudder bridge 151 will be moved across their respective resistors and cause signals to be transmitted to amplifiers 13 and 14, respectively. Since the heading of the aircraft in azimuth is to be changed, the need for operation of the rudder will be apparent; and the movement of wiper 166 across resistor 167 of potentiometer 165 will cause a voltage to appear between wiper 166 and 154 which will be transmitted to the rudder amplifier 14. This will cause the rudder servo motor 17 to be operated to reposition the rudder in a direction tending to return the plane toward its original heading, and wiper 154 will simultaneously be moved until the balance of the bridge is restored.

The need for operation of the ailerons when the aircraft is to be turned in azimuth is not so apparent as the need for operation of the rudder as just described. However, for the quickest return of the aircraft to its original position, the turn must be coordinated so that the resultant of the centrifugal and gravitational forces acting upon the aircraft during the turn will pass through the craft in the same direction that the gravitational force alone does when the plane is flying with its wings level. To insure that the turn made by the plane under these conditions is coordinated, wiper 47 of potentiometer 46 is moved by the mechanical linkage 352, as previously mentioned, whenever the azimuth responsive instrument 50 indicates that a deviation has been made from a desired heading in azimuth. As a result, a signal appears between wiper 47 and the center tap of resistor 48; and the amount of this signal which is transmitted to amplifier 13 may be varied by adjusting wiper 56 of potentiometer 55. When the signal is applied to amplifier 13, of course, it operates the servo motor 16 to reposition the ailerons the necessary amount to provide the desired degree of bank.

From previous discussions, it will be seen that whenever the plane banks about its roll axis, a signal is put into the aileron and rudder networks 10 and 11, respectively, by the vertical gyroscope 40; and thus when the plane is caused to bank and make its coordinated return to its original heading in azimuth, the vertical gyroscope causes the mechanical linkage 351 to reposition wipers 27 and 172 of potentiometers 26 and 171 in the aileron bridge and rudder networks, respectively. The effect of this is to decrease the signal sent to the aileron and rudder amplifiers 13 and 14, or expressed differently, the deflection of the ailerons and the rudder is reduced. The magnitude of the signals reaching the amplifiers 13 and 14 from networks 22 and 152 is determined by the position of the wiper 56 of potentiometer 55, and wiper 172 of potentiometer 171. By varying the amount of this opposing signal from the potentiometer 171, operated by the vertical gyroscope 40, the resulting effect of the displacement of the wiper 165 may be controlled. Similarly, by varying the signal from the potentiometer 46, controlled by the azimuth responsive instrument 50, the amount of signal from the potentiometer 26, controlled by the vertical gyroscope 40, necessary to cancel the first signal may be controlled. As a result, the angle of bank for a given deviation in azimuth may be controlled by the adjustment of potentiometer 55. In the same way, the deflection of the rudder may be controlled by the adjustment of potentiometer 174. To adjust the potentiometers, the plane will generally be placed in a turn by displacing the mechanical linkage 352 to one side and holding it in that displaced position while the necessary adjustments are made. The wiper 56 is adjusted until the plane is banking at the desired angle for the displacement of linkage 352, and wiper 175 is then adjusted until the turn and bank indicator on the instrument panel indicates that a coordinated turn is being made. Under these conditions, the effect of the azimuth responsive instrument and the effect of the vertical gyroscope 40 are both present in the networks 10 and 11.

After the necessary adjustments have been made, the mechanical linkage 352 is returned to center position, and any further movement thereof will first cause the ailerons and rudder to be displaced, and then as the plane banks, the control surfaces will be returned toward their original position as previously mentioned.

At the same time that the plane starts to bank about its roll axis, and the wipers 172 and 27 of potentiometers 171 and 26, respectively, are moved, wiper 221 of potentiometer 220 is also moved to provide an upward movement of the elevator to maintain the altitude of the plane, as previously described.

Should the plane tilt about its pitch axis, i. e., if the nose of the plane is raised or lowered, this change in the angular position of the aircraft will be detected by the vertical gyroscope 40 and will cause the mechanical linkage 350 to be moved and the latter will reposition wiper 216 of potentiometer 215 in the elevator bridge 201. When this is done, a signal will be transmitted to the elevator amplifier 15 which will cause the latter to operate the servo motor 18 in a direction tending to restore the desired attitude of the plane as measured about its pitch axis. As the motor 18 is operated, the wiper 224 of the potentiometer 203 will be repositioned until a condition of balance is obtained for the bridge 201, at which time operation of the servo motor 18 will cease. When the plane is once again flying as desired, the vertical gyroscope 40 will cause the mechanical linkage 350 to return the wiper 216 to its original position, thereby unbalancing the bridge 201 in the opposite direction and causing the amplifier 15 to operate the servo motor to again reposition the elevator and return it to its original position. In this way, the altitude of the aircraft is generally maintained whenever any change of the craft about its pitch axis tends to change the altitude thereof.

If the aircraft is flying at a substantially constant altitude, as previously described, and it is desired to change that altitude, it is only necessary to reposition wipers 207 and 211 of potentiometers 206 and 210 in the proper direction. When this is done, the bridge 201 will be unbalanced and the signal appearing between wipers 204 and 216 will be transmitted to the amplifier 15 and the latter will cause the servomotor 18 to operate to reposition the elevator and to move wiper 204 toward a position of balance for the bridge 201. As the elevator starts to move, the angle of the plane about its pitch axis will be changed; and this will cause the linkage 350 to be moved by the vertical gyroscope 40 and reposition wiper 216 of potentiometer 215. The movement of wiper 216 is in a direction tending to balance the bridge with the wiper 204 displaced from its original position, and as a result, the elevator will remain somewhat displaced from its original position until the wipers 207 and 211 of potentiometers 206 and 210 are returned to their original positions.

If, because of movement of passengers or other shifting of load, the center of gravity of the plane is shifted along its length, the original position of the elevator will no longer be suitable to maintain level flight. Under these conditions, the potentiometers 206 and 210 may be adjusted to reposition the elevators and return the craft to level flight. The action of the amplifier 15, servomotor 18, potentiometer 203, vertical gyroscope 40, and potentiometer 215 is similar to that previously described in connection with the change of altitude of the craft.

If, because of changes in loading or changes in power, one wing of the aircraft tends to drop below the other, the potentiometers 34 and 33 may be readjusted to change the normal position of the ailerons and thus restore the craft to its former angular position about its roll axis. Similarly, the normal position of the rudder may be changed by adjusting the potentiometers 156 and 160 of the rudder bridge 151; and the operation of the aileron circuit and rudder circuits under these conditions is similar to that of the elevator circuit previously described.

With the switches 93 to 97, inclusive, in position No. 2, movement of the controllers 117 and 127 has no effect upon the operation of the aircraft. When the switches are moved to position 3, however, transformer 114 is energized through switch 97 and conductor 91 is connected through switch 93 to movable contact 104. If it is now assumed that transfer relay operating coil 105 is deenergized and all the movable contacts of that relay are bearing against their corresponding "out" contacts, conductor 91 is connected to conductor 107 leading to network 108. Since transformer 114 is now energized, secondary winding 113 thereof impresses a voltage across the ends of resistor 112 of potentiometer 110; and any movement of grounded wiper 111 away from the center tap of that resistor will cause a voltage to appear between conductor 107 and ground. This voltage will be transmitted through "out" contact 106 and movable contact 104, through conductor 103, switch 93, and conductor 91 to the adjusting network 80, where it will be impressed across resistors 85 and 86 of potentiometers 81 and 82, respectively. These resistors with their associated wipers, act as voltage dividers and the desired portion of the voltage appearing between conductor 107 and ground may be selected by adjusting the wipers to the proper position.

From wiper 83, the voltage is transmitted as previously described to the input of amplifier 13. This signal causes the amplifier to operate the servomotor 16 to reposition the ailerons and simultaneously to move the wiper 24 of potentiometer 23. The direction of movement of wiper 24 is such as to cause a signal to appear between that wiper and wiper 27 of potentiometer 26 which is equal in magnitude and opposite in phase to that appearing between wiper 83 and ground. As the ailerons start to move, the plane starts to move about its roll axis; and when the signal appearing between wipers 24 and 27 cancels that appearing between wiper 83 and ground, the operation of the servomotor 16 ceases. As the plane changes its angle about its roll axis, however, the vertical gyroscope 40 senses this change and causes the mechanical linkage 351 to move wiper 27 of potentiometer 26. Since the plane is tilted in one direction, the vertical gyroscope will move the potentiometer wiper 27 in a direction to cause a signal to be put in which would normally drive the ailerons in a direction to return the aircraft to a position where its wings are level. However, because of the signal put in by bridge 108, the ailerons are not driven in the opposite direction but are merely returned to their original position so that banking of the plane about its roll axis does not continue, but instead the plane remains in the bank it has then assumed.

At this time, the controller 117 is being held to one side, with a wiper 111 moved across the resistor 112. The plane is in a bank and the vertical gyroscope 40 has caused the potentiometer wiper 27 to be displaced along the resistor 28, and the wiper 24 has been returned to its original position. The voltage appearing between wipers 24 and 27 is equal in magnitude and opposite in phase to that appearing between wiper 83 and ground, and there is thus no signal being transmitted to the amplifier 13 to operate the servomotor 16.

When the control device 117 is returned to its center position, wiper 111 is likewise returned to its center position, and the voltage previously impressed across resistor 85 in network 80 is removed and wiper 83 is thereby returned to ground potential. When this happens, the only voltage remaining in the aileron circuit is that appearing between wipers 24 and 27 in the bridge 21, and this is phased so that when it is impressed upon the amplifier 13, the latter operates the servo motor 16 in a direction to cause the ailerons to return the plane to the position where its wings are level. This operation is similar to that previously described for the condition when one wing was caused to drop by the action of air currents, and will not be repeated here.

The voltage which appears between conductors 87 and 88, when wiper 111 is displaced from its center position to produce a voltage between wiper 83 and ground, also produces a voltage between wiper 84 and ground. This voltage is conducted by conductor 184 to wiper 154 of bridge 151 and is transmitted from that bridge through network 152 and then to the input of amplifier 14. Amplifier 14 then energizes servo motor 17 to cause the latter to reposition the rudder so as to cause the plane to turn in a direction toward the wing which is lower. As the rudder is repositioned, wiper 154 of potentiometer 153 is moved in a direction to cause a signal to appear between that wiper and wiper 166 which is equal in magnitude and opposite in phase to the signal appearing between wiper 84 and ground. The voltage signal to the amplifier 14 is thereby canceled and the operation of the servo motor 17 ceases.

At the same time that the rudder is repositioned to cause the plane to turn, the ailerons are repositioned to place the plane in a bank as previously described; and wiper 172 of potentiometer 171 is thereby displaced by mechanical linkage 351 acting under the influence of the vertical gyroscope 40. The voltage appearing between wiper 172 and the center tap of resistor 173 is applied to the ends of resistor 176 of potentiometer 174; and a portion of this voltage appears between wiper 175 and conductor 170 and is transmitted to the amplifier 14. This latter voltage will oppose the voltage appearing between wiper 84 and ground; and as the plane banks, the rudder will therefore be returned towards its original position after having been displaced therefrom by the operation of potentiometer 110 and bridge 108. In this way, the rudder is first deflected a larger amount to place the craft in a turn, and then as the plane banks in that turn, the rudder deflection is reduced to a point just sufficient to produce a coordinated turn.

When the wiper 111 of the potentiometer 110 is returned to its center position, conductor 87 is returned to ground potential as is wiper 84, conductor 184, and wiper 154. The voltage appearing between wiper 175 of potentiometer 174 in network 152 is considerably larger than the voltage appearing between wiper 166 and wiper 154 of bridge 151; and the voltage from network 152 therefore dominates and causes the amplifier 14 to energize servo motor 17 in a direction to return the rudder and wiper 154 to their original positions. At the same time this is happening, the ailerons are returning the plane to a position with its wings level, and vertical gyroscope 40 is therefore moving mechanical linkage 351 to return wiper 172 to its original position, and thereby returning the plane and the control networks to their original condition.

It is to be understood, of course, that the operation of the rudder and the ailerons just described occurs simultaneously, so that as the plane is banked about its roll axis, the rudder is displaced to cause the plane to turn in a coordinated turn. When the control device 117 is then returned to its original position, the aileron and rudder are then operated to cause the plane to straighten out and fly with its wings level on the new heading. Furthermore, it is to be understood that while the operation of the various potentiometers has been described in sequence, in actual operation these various movements and controls occur simultaneously instead of step by step.

When the aircraft is banked and turned under the influence of the control device 117, the change of the angular position of the craft about its roll axis causes the vertical gyroscope 40 and the mechanical linkage 351 associated therewith to move the wiper 221 of the up-elevator potentiometer 220 in a manner previously described to apply up-elevator and maintain the plane at substantially the same altitude. Aside from the application of up-elevator when the plane banks, the movement of wiper 111 across resistor 112 causes no action in the elevator circuit of the control system.

When the airplane is being turned by means of the control device 117 as just described, the normal operation of the azimuth responsive instrument 50 must be interrupted so that it will not introduce signals into the control network which would tend to nullify the action just described. Even if it were possible to overcome the action of the azimuth responsive instrument to a certain extent by the operation of the control device, when the new heading had been achieved and the control device were returned to its center position, the azimuth responsive instrument would have displaced the mechanical linkage 352 and would then return the plane to its original heading in the manner previously described in connection with an accidental change in azimuth. To prevent this from occurring, the switch 360 is operated whenever the wiper 111 is displaced from its center position. Contact 363 of switch 360 is energized whenever switch 95 is in position No. 3; and whenever the wiper 111 is displaced from its center position, the movable finger 361 permits contact 362 to bear against contact 363 and thereby complete a circuit through "out" contact 371, movable contact 372, and conductor 373 to the locking means 353 associated with the azimuth responsive instrument 50. Similarly, when switches 93 to 97 are in position 1, the locking means 353 is energized through conductor 355, movable contact 354 and "in" contact 356 of servo relay 59, conductor 131, switch 94, conductor 339, and conductor 325, as previously described. The locking means 353 will thus be energized when switches 93 to 97 are in position 1, or when the switches are in position 3 and the operating control device 117 or 127 is displaced from normal position. The need for the energization of the locking means 353 when switches 93 to 97 are in position 1 will be hereinafter explained. Linkage 352 is thus held in its centered position; and the azimuth responsive instrument 50 slips with respect to the mechanical linkage 352, and there is thus no movement of wiper 47 of potentiometer 46 in network 22, nor of wiper 166 of potentiometer 165 in bridge 151.

When the control device 117 is moved so that grounded wiper 262 is moved across resistor 263 of potentiometer 261, a voltage is produced between that wiper and conductor 265 which is transmitted through "out" contact 266, movable contact 270, resistor 271, and conductor 272 to wiper 204. From wiper 204 this voltage signal is transmitted through bridge 201 and network 202 to the input terminals of amplifier 15, and the latter causes the servo motor 18 to be operated to reposition the elevator and wiper 204 of potentiometer 203. As wiper 204 is moved, a voltage appears between it and wiper 216 which is opposite in phase and increases in magnitude until it completely cancels the voltage appearing between conductor 265 and ground. When this occurs, the operation of the servo motor 18 ceases. The elevator is thus deflected and the airplane starts to climb or dive depending upon which way the elevator is deflected. The climbing or diving is caused by the change of the angular position of the aircraft about its pitch axis, and as this position is changed, the vertical gyroscope 40 senses the change and causes the mechanical linkage 350 to move the wiper 216 of the potentiometer 215. This introduces a signal having a phase opposite to that of the signal from the network 260 and as a result the amplifier 15 causes the servo motor 18 to drive in such a direction as to return the elevator toward its original position. The aircraft will therefore continue to climb or dive at a rate determined by the position of the control device 117 and by the air speed of the craft. When wiper 262 of potentiometer 261 is returned to its center position, the voltage appearing between conductor 265 and ground is removed, and wiper 204 is thus returned to ground potential. A voltage thus appears between wiper 204 and wiper 216 which has an opposite phase to that originally appearing between conductor 265 and ground. This voltage is applied to the input terminals of amplifier 15 and causes the servo motor 18 to be operated in the reverse direction, thereby reversing the deflection of the elevator and moving wiper 204 at the same time. This action of the elevator causes the plane to level out, and the vertical gyroscope 40 thereupon causes the mechanical linkage 350 to return the wiper 216 to its original position, causing the elevator to be returned once more to its original position as the wiper 204 also is moved by servo motor 18 in response to signals to the amplifier 15. In the elevator network 12, as in the aileron and rudder networks 10 and 11, the movement of the rebalancing potentiometer wiper 204 and the wiper 216 of the potentiometer 215 has been described as sequential acts; but it is to be understood that this is for the purpose of description only, since these movements occur substantially simultaneously instead of sequentially.

The control device 117 is designed so that potentiometer 110 and potentiometer 262 may be simultaneously and independently controlled; and it is thus possible to operate potentiometer 110 without operating potentiometer 261, potentiometer 261 may be operated without operating potentiometer 110, or both potentiometers 110 and 261 may be simultaneously operated. If potentiometer 110 is operated, the plane will be turned; if potentiometer 261 is operated, the plane will be caused to climb or dive; and if both are operated at the same time, the plane will be caused to make a climbing or diving turn.

It is sometimes desirable to have the control device 117 operative to control only the elevator of the aircraft and inoperative to control the ailerons and rudder thereof, so that if the control device is accidentally moved in a manner to operate the potentiometer 110, there will be no effect upon the ailerons and rudder. Such a condition may arise when it is desired to make a series of photographs of a certain strip of terrain and it is necessary that the altitude be maintained very accurately in spite of updrafts or downdrafts of air. Under these conditions, the antopilot is allowed to control the heading of the ship in azimuth so that the desired constant course is flown, while the pilot maintains the altitude of the plane by means of the controller 117 and the elevator controls.

To accomplish this, the ganged switches 93, 94, 95, 96, and 97 are turned to position 4. When this is done, conductor 91 is grounded through switch 93 at 99, and any voltage appearing between conductor 107 and ground is impressed across resistor 116. Since conductor 91 is maintained at ground potential, conductor 87 and hence wipers 83 and 84 of potentiometers 81 and 82 are likewise maintained at ground potential; and any movement of grounded wiper 111 away from its center position will have no effect upon either the aileron network 10 or the rudder network 11. The operation of the bridge circuits 10 and 11 is thus the same as when the switches 93 to 97, inclusive, are in position 2, and any tilting of the wings or turning of the plane in azimuth is sensed by the vertical gyroscope 40 and the azimuth responsive instrument 50 and immediately corrected. Switch blade 305 of switch 95 is in position 4, but in this position there is no power applied to the switch blade, and hence switch 360 is ineffective to operate the brake or locking mechanism 353 of the azimuth responsive instrument 50.

Conductor 265, however, leading from network 260, is connected through "out" contact 266 and movable contact 270 of the transfer relay 109 through resistor 271, conductor 272, resistor 291, and switch 96 to ground at 294. Any voltage appearing between conductor 265 and ground, because of the displacement of grounded wiper 262 from its center position, will be impressed across resistors 271 and 291 in series. These resistors together form a voltage divider, and their common point of connection will have a definite potential with respect to ground which will be a constant fraction of the voltage appearing between movable contact 270 and ground. Wiper 204 of rebalancing potentiometer 203 in the elevator bridge 201 is connected to conductor 272, one of the conductors connecting resistors 271 and 291 together. As a result, wiper 204 will always be at a potential with respect to ground which is a fixed percentage of the voltage appearing between conductor 265 and ground. The voltage appearing between wiper 204 and ground will be transmitted to bridge 201 and network 202 to the elevator amplifier 15, where it will cause the latter to operate the servo motor 18 to reposition the elevator. The balancing operation of the network 12 under these conditions is in all respects similar to that previously described in connection with the operation of the elevator network 12 when the switches 93 to 97, inclusive, are in position 3. However, because of the voltage dividing action of resistors 271 and 291, the movement of the elevator for a given movement of the grounded wiper 262 will be materially reduced when the ganged switches 93 to 97, inclusive, are in position 4 instead of position 3. This is a very desirable effect, since under the conditions when these switches are in position 4, a delicate, vernier action of the controller 117 is desired rather than a coarser control with a greater amount of control.

It wil be seen that when switches 93 to 97, inclusive, are in positions 2, 3, or 4, the responsive instruments 40 and 50 are effective to control the flight of the aircraft. However, when the responsive instruments 40 and 50 are effective to control the flight of the aircraft, their action is generally to reduce the deflection of the control surfaces as the aircraft reaches the desired new angular position. While the speed of change of the angular position of the aircraft is generally sufficient for all practical purposes, generally being sufficiently great so that the passengers may be made uncomfortable should such speed be necessary, under certain emergency conditions it is necessary to exceed even this rate of change of angular position.

To secure the advantages of servo motor control of the control surfaces, while at the same time avoiding the slower response thereof caused by the action of the responsive devices 40 and 50, and also avoiding the limitations of the angular deviation of the craft imposed by the responsive devices, the switches 93 to 97, inclusive, may be turned to position No. 1. When this is done, the servo relay 59 has its operating coil 62 energized from the source of power 320, through conductors 325 and 330, switch 94, and conductor 131 to the coil 62 and from the latter to ground and back to the source of power. When the operating coil 62 is energized, the movable contacts 63, 182, 237, and 354 are moved from "out" contacts 61, 182, 236, to "in" contacts 73, 131, 256, and 355. When contact 354 bears against "in" contact 355, a circuit is completed from conductor 131, which is connected through switch 94 as previously mentioned, through conductor 355 to the locking means 353 and then to ground. If wipers 47 and 166 of potentiometers 46 and 165 are centered, as they should be when switches 93 to 97, inclusive, are moved to position 1, the operation of the locking means 353 will hold these wipers in their centered positions, regardless of the change in heading of the aircraft; and there will thus be no signal introduced into the aileron network 10 or the rudder network 11 because of the operation of these potentiometers. The movement of the mechanical linkages 350 and 351, controlled by the vertical gyroscope 40, will in no way be restrained; but, as will be explained, the operation of the potentiometers controlled by these linkages will have no effect upon the input circuits of the amplifiers 13, 14, and 15.

When switches 93 to 97, inclusive, are placed in position 1, transformer 114, which energizes the bridges 108, 260, 122, and 286, will be energized by the inverter 303 through switch 97. Simultaneously, since contact 101 of switch 93 is not connected to anything, conductor 91 is connected to network 108 through resistor 116, movable contact 104, and "out" contact 106.

In general, the current drawn through the networks 10, 11, and 12 is quite small, since the input circuits in the amplifiers 13, 14, and 15 are connected to the grid circuits of amplifier tubes. As is well known, the current drawn by the grid circuit of an amplifier tube is very small, and consequently the voltage drop through a series resistor in the various networks is generally considered to be negligible. In the case of adjusting network 80, two resistors, 85 and 86, are connected in parallel and are connected to act as voltage dividers, as previously mentioned. Such a circuit is a very satisfactory method of reducing a voltage which is to be applied to a vacuum tube control element. To reduce still further the voltage appearing between wiper 83 and ground and wiper 84 and ground, resistor 116 is connected between the source of voltage, network 108, and network 80.

It will be seen that for a given deflection of grounded wiper 111 from its center position, a voltage will appear between conductor 107 and ground, and when switch 93 is in position 3, the full value of this voltage will be transmitted through conductor 91 to conductor 87 where it will be impressed across resistors 86 and 85. However, when switch 93 is in position No. 1, a series parallel circuit will be formed which includes resistor 116 in series with the parallel resistors 85 and 86. As a result, the voltage appearing between conductor 87 and ground will be materially reduced in the manner of the well known voltage divider; and likewise the voltage appearing between wiper 83 and ground and wiper 84 and ground will be much smaller when switch 93 is in position 1 than when it is in position 3. Consequently, the signal appearing between wiper 24 and ground and wiper 154 and ground will be much smaller when switch 93 is in position 1. The need for this reduced signal when switches 93 to 97, inclusive, are in position 1, will be explained hereinafter.

As previously explained, when switches 93 to 97, inclusive, are in position 1, the circuit in the aileron network 10 is traced from wiper 24 through potentiometer 23, potentiometers 33 and 34, and potentiometer 70 to the "in" contact 73 of the servo relay 59, and then through movable contact 63 to the input of amplifier 13. Potentiometer 70 is a manually adjustable potentiometer which is provided to complete a bridge circuit including the rebalancing potentiometer 23 and the secondary winding 32. The potentiometer 70 is adjusted so that when switches 93 to 97 are moved from position 2 to position 1, with network 108 balanced, no movement of the ailerons can be detected.

If it is assumed that the aircraft is in level flight, with the switches 93 to 97 inclusive, in position 2, 3, or 4, and the switches are then moved to position 1, no voltage will appear between wiper 71 of potentiometer 70 and wiper 24 of rebalancing potentiometer 23. If the control device 117 is now moved so that grounded wiper 111 of potentiometer 110 is displaced from its center position, a voltage will appear between conductor 107 and ground, and a portion of this voltage will appear between wiper 24 and ground. This portion of the voltage will be transmitted to "in" contact 73 of the servo relay 59 and then to the amplifier 13, where it will energize the latter to cause the operation of the servo motor 16 to reposition the ailerons and simultaneously move the wiper 24 to a new position wherein the voltage appearing between wiper 24 and wiper 71 will be equal and opposite to that appearing between wiper 24 and ground. When this occurs, the voltage signal applied to the input terminals of amplifier 15 will be reduced to zero, and the operation of the servo motor 16 will cease.

The ailerons of the aircraft are now displaced, and they will remain in this displaced position until wiper 111 of potentiometer 110 is returned to center position. The displacement of the ailerons will cause the aircraft to be angularly moved about its roll axis, continuing this rotation about its roll axis as long as the ailerons are displaced.

When the control device 117 is returned to its center position, wiper 111 is likewise returned to its center or normal position, and wiper 24 is returned to ground potential. The only voltage now transmitted to the amplifier input is that which appears between wiper 24 and wiper 71, and this voltage is such as to cause the servo motor 16 to be rotated so as to return the ailerons to their original position and reduce the voltage appearing between wiper 24 and wiper 71 to zero. This means that to cause the airplane to rotate a given amount about its roll axis, the control device 117 must be displaced to one side to cause the ailerons to be deflected; and then as the aircraft approaches the desired angular position, the control device 117 is then returned to center. The aircraft will tend to remain in this banked condition until the ailerons are deflected in the opposite direction to return the plane to a condition of flight with its wings level. To do this, the control device 117 is moved in the opposite direction to cause the ailerons to be deflected in a direction opposite to their first deflection, and then as the plane approaches a position with its wings level, the controlled device is returned to center position.

It will be seen that this operation of the control device 117 is very similar to that of the well known "stick" used in the control of aircraft, where the stick is moved to one side to deflect the ailerons and cause the plane to deviate about its roll axis, and the stick is then neutralized or centered to return the ailerons to their original position and prevent continued rotation of the plane about its roll axis. To return the plane to a condition of flight with its wings level, the stick is displaced in the opposite direction; and as the aircraft returns to its original position, the stick is again neutralized. This action is quite different from that obtained when the switches 93 to 97, inclusive, are in positions 3 or 4, where the degree of angular movement of the plane about its roll axis is determined by the amount that the control device 117 is moved from its center position. As the aircraft approaches this position with switches 93 to 97 in positions 3 or 4, the action of the vertical gyroscope 40 is such as to neutralize the controls or return the ailerons to their original position, thereby preventing continued rotation of the aircraft about its roll axis.

Since the balancing effect of the gyroscopically operated potentiometer 26 is removed from the aileron network 10 when the switches 93 to 97 are in position No. 1, the voltage impressed across the input terminals of amplifier 13 would be considerably greater for a given movement of the control device 117, when switches 93 to 97 are in position 1 than when they are in position 3. The lack of a balancing voltage from the potentiometers controlled by the responsive devices 49 and 50 may permit the servo motors 16, 17, and 18 to be driven to the limits of their travel with very little movement of the control device 117, thereby providing a very coarse control. It is for this reason that the resistor 116 is inserted in series with the adjusting network 88 when the switches 93 to 97, inclusive, are in position No. 1.

Somewhat similar action is obtained from the rudder network 11 when switches 93 to 97, inclusive, are in position No. 1. As previously mentioned, when the switches are in this position, the locking means 353 of the azimuth responsive instrument 50 is energized, holding the mechanical linkage 352 in the centered position in which it has previously been placed. The potentiometer 171 is operated by the mechanical linkage 351 attached to the vertical gyroscope 40, and it is the operation of this latter potentiometer which must be by-passed in order to provide the desired control characteristic. To do this, "in" contact 181 of servo relay 59 is connected by conductor 180 to conductor 170; and movable contact 182 is connected by conductor 183 to wiper 175. When servo relay 59 is energized, conductor 170 is connected through relay contacts 181 and 182 to wiper 175, thereby shorting the output terminals of network 152 and reducing its effect to zero. The movement of wiper 172 by the mechanical linkage 351 thus has no effect upon the voltage transmitted to the input terminals of amplifier 14 when switches 93 to 97, inclusive, are in position No. 1. Since potentiometer 171 has no effect upon the signal transmitted to the amplifier 14, and since wiper 166 of potentiometer 165 is held against movement by the locking means 353, the effect of the responsive instruments 40 and 50 is eliminated when switches 93 to 97 are in position 1.

In view of the foregoing, it will be seen that when control device 117 is moved to displace wiper 111 from its normal position, a voltage appears between wiper 84 of potentiometer 82 in the adjusting network 80. This voltage is transmitted by conductor 184 to wiper 154 of potentiometer 153 in the rudder bridge 151; and from there it is transmitted by conductor 170, conductor 180, to contacts 181 and 182 of the servo relay 59 and by conductors 183 and 178 to the rudder amplifier 14. When the input circuit of the amplifier 14 is so energized, it energizes the servo motor 17 to cause it to drive the rudder in a direction determined by the direction of movement of the control device 117, and the motor simultaneously repositions the wiper 154 of the potentiometer 153 in the network 151. A voltage thus appears between wiper 154 and 166 of the bridge circuit, and when this voltage reaches a value where it is equal and opposite to the voltage appearing between wiper 154 and ground, the two voltages cancel each other and the signal transmitted to the amplifier 14 is therefore reduced to zero and operation of the servo motor 17 ceases. Since the responsive instruments 40 and 50 are effectively disconnected from the circuit, the rudder will remain in its displaced condition so long as the control device 117 remains displaced from its normal position. When the controller is again centered, wiper 154 of potentiometer 153 will be returned to ground potential; and the signal impressed upon the input circuit of amplifier 14 will be such as to cause the servo motor 17 to drive the rudder back to its original position, simultaneously returning wiper 154 to its original position.

Considering now the operation of both the aileron and rudder networks 10 and 11, respectively, it will be seen that when the control device 117 is displaced from its center position, a signal will be impressed across the input terminals of amplifiers 13 and 14 causing these amplifiers to operate servo motors 16 and 17, respectively, thereby causing a deflection of the ailerons and rudder. When this is done, the airplane will turn about its roll axis and also turn in azimuth, and as the desired angle is approached in the roll axis, the control device 117 will be returned to center position, thereby stopping movement of the craft about its roll axis. As the control device 117 is returned to center position, the rudder is likewise returned to its original position, and the aircraft continues to turn because of the bank which has been caused by the deflection of the ailerons. As the desired heading is approached, the control device 117 is deflected in the opposite direction, thereby causing the ailerons and rudder to be deflected in a direction opposite to their first deflection, and the aircraft will thus return to a position with its wings level but with a new heading in azimuth. As the wings approach the level position, the control device 117 will be returned to its center position, thereby again returning the ailerons and rudder to their original positions.

The operation of the elevator controls when switches 93 to 97, inclusive, are in position 1 is similar in most respects to the operation of the aileron circuit previously described. When the control device 117 is operated so as to move the grounded wiper 262 of the potentiometer 261 away from its normal position, a voltage appears between conductor 265 and ground which is transmitted to wiper 204 of potentiometer 203 and bridge 201. From wiper 204, the circuit for the signal continues as previously traced to the input circuit of amplifier 15. This voltage signal then causes the latter to operate the servo motor 18 to reposition the elevator, while at the same time wiper 204 is repositioned so that a voltage appears between it and wiper 251 which is opposite in phase and increases in magnitude until it completely balances the voltage appearing between conductor 265 and ground. When this balanced condition is reached, amplifier 15 no longer causes the servo motor 18 to drive, and movement of the elevator ceases. When wiper 262 is returned to its normal position, the voltage appearing between wiper 204 and ground is removed, and the voltage appearing between wipers 251 and 204 is such as to cause the amplifier 15 to drive the servo motor 18 to restore the elevator to its original position, simultaneously restoring the wiper 204 to its original position.

It will be noted that when switches 93 to 97, inclusive, are in position 1, no provision is made for decreasing the voltage appearing between conductor 265 and ground to a lower value for application to wiper 204 of potentiometer 203. While resistor 271 is connected in series between wiper 204 and movable contact 270 of the transfer relay, the amount of current flowing through this resistor and to the input circuit of the amplifier 15 is so small, as previously mentioned, as to cause a practically negligible voltage drop. In the case of the aileron and rudder networks 10 and 11, a resistor 116 or similar means must be connected in the circuit between the network 108 and the adjusting network 80 because of the fact that a relatively high voltage is impressed across the ends of resistor 112 of potentiometer 110. This higher voltage is necessary because of the fact that the plane is often banked to an angle of 40 degrees with the horizontal, and the relatively high voltage is needed to overcome the balancing effect of the potentiometers controlled by the responsive instruments 40 and 50. In the case of the elevator circuit 12, a much smaller voltage may be impressed across the ends of resistor 263 of potentiometer 261 in network 260, since the aircraft normally does not have its angle about its pitch axis changed to such a marked degree as in the case of the angular change about the roll axis. For this reason, the voltage obtainable between conductor 265 and ground will be much smaller than that obtainable between conductor 107 and ground; and consequently no special means are necessary to prevent too high a voltage from appearing between wiper 204 and ground.

The entire description heretofore has been predicated upon the basis that coil 105 of the transfer relay 109 is deenergized and that the pilot has control of the autopilot through his operation of control device 117 and the networks 108 and 260 associated therewith. If the copilot wishes to secure control, he momentarily closes switch 336 to energize coil 105, and when the movable contacts associated therewith are moved to their "in" position, switch 336 may be opened and the circuit will be maintained through movable contact 338 and "in" contact 337 of the relay. The other movable contacts 104, 270, and 372 of the transfer relay 109 have been moved from their "out" to their "in" positions, and networks 108 and 260 have been disconnected and networks 122 and 286 substituted in their place. The copilot may then control the operation of the aircraft by his operation of control device 127, and the response of the plane is in all respects identical to that previously described for the condition when the pilot had control. When the pilot wishes to regain control of the airplane, he merely closes switch 346 momentarily, thereby shorting coil 105 and deenergizing it, whereupon the movable contacts of the transfer relay 109 will be moved to their "out" position and control device 117 will once again be effective to control the flight of the aircraft.

It will thus be seen that we have provided a control system in which the pilot may have the choice of any one of several different types of operation. He may use the autopilot alone to provide a smooth comfortable flight following a precise path; he may use the autopilot and modify its action by the control device 117; he may use the autopilot and modify its action in one axis only by using the control device 117; or he may effectively disconnect the gyroscopic or other suitable control of the autopilot and use only the servo motors to control the position of the control surfaces as determined by the operation of the control device 117. In this last form of operation, the control device is operated as the conventional stick in an airplane, but the pilot is relieved of substantially all of the physical labor of flying under these conditions. By the use of this system, pilot fatigue is greatly reduced, and the possibility of pilot-caused errors due to fatigue is materially reduced.

While we have shown and described a preferred form of our invention, we do not wish to be limited to the particular form or arrangement of parts herein described and shown, except as covered by our claims.

We claim as our invention:

1. A control apparatus for an aircraft having a control surface adapted to change the angular position of the aircraft about an axis, and including: motor means operable to position said control surface; means responsive to the angular position of said aircraft about said axis; a first variable impedance controlled by said responsive means; a manually controlled impedance; a follow up type control system connected to said motor means and including said first variable impedance and said manually operated impedance, said control system being effective to control the operation of said motor means in accordance with signals provided by said first variable impedance and by said manually operated impedance; and switching means adapted to render said manual control means ineffective and said first variable impedance effective to control the operation of said motor in such a manner as to tend to maintain said aircraft in a predetermined angular position about said axis, or to render said manually operated impedance effective to produce a signal in accordance with the operation of said impedance, and said first variable impedance effective to produce a signal tending to maintain said aircraft in a given angular position about said axis, whereby said manually operated impedance may be operated to modify the effect of said first variable impedance and thereby change the angular position which said first variable impedance will tend to maintain.

2. A control apparatus for an aircraft having a control surface adapted to change the angular position of the aircraft about an axis and including: motor means operable to position said control surface; means responsive to the angular position of said aircraft about said axis; a first variable resistor controlled by said responsive means; a manually controlled variable resistor; a rebalancing variable resistor controlled by said motor means; a control circuit including said first resistor, said manually controlled resistor and said rebalancing resistor and adapted to cause signals to be developed by said resistors which may be used to control the operation of said motor means, said first resistor providing a signal tending to maintain said aircraft in a predetermined angular position about said axis, and said manually operated resistor providing a signal tending to operate said motor means without regard for the angular position of said aircraft about said axis; and switching means operable to render both said first resistor and said manually controlled resistor effective to control the operation of said motor means whereby said first resistor provides a signal to maintain said aircraft in a given angular position about said axis and said manually operated resistor is effective to modify the action of said first resistor to change the angular position which said first resistor tends to maintain, or to render said first resistor ineffective and said manually operated resistor effective to control the operation of said motor means whereby said motor means is operated in accordance with the operation of said manually operated resistor.

3. A control apparatus for an aircraft having a control surface adapted to change the position of the aircraft about an axis and including: motor means operable to position said control surface; means responsive to the angular position of said aircraft about said axis; a first variable resistor controlled by said responsive means; a manually controlled variable resistor; a rebalancing variable resistor controlled by said motor means; a control circuit of the rebalancing type operable to control the operation of said motor means and including said first variable resistor, said manually controlled variable resistor, and said rebalancing resistor, said first resistor providing a signal which tends to operate said motor means so as to maintain said aircraft in a predetermined angular position about its axis, and said manually controlled resistor providing a signal which normally tends to operate said motor means; and switching means operable to render said manually controlled resistor ineffective and said first resistor effective to control the operation of said motor means, or to render said manually operated means effective to control the operation of said motor means while effectively disconnecting said first variable resistor from said control circuit to render it ineffective to control said motor means.

4. A control apparatus for an aircraft having a control surface adapted to change the angular position of the aircraft about an axis and including: motor means operable to position said control surface; means responsive to the angular position of said aircraft about said axis; a first variable resistor operated by said responsive means; a manually variable resistor; a rebalancing resistor operated by said motor means; a control circuit connected to said motor means and including said first variable resistor, said manually variable resistor, and said rebalancing resistor and adapted to control the operation of said motor means in accordance with signals provided by said resistors, said circuit having two alternate connections, one of said connections including said first resistor in the effective portion of said control circuit and said second alternate connection not including said first resistor in the effective portion of said control circuit; and manual switching means selectively operable to render said manually variable resistor ineffective to provide a signal controlling the operation of said motor means and to complete said circuit through said first alternate connection whereby said first resistor is effective to control the operation of said motor means and thereby tend to maintain said aircraft in a predetermined angular position about said axis, or to render said manually variable resistor effective to provide a signal controlling the operation of said motor means and to complete said circuit through said first alternate connection whereby said first resistor is effective to control the operation of said motor means and thereby tend to maintain said aircraft in a predetermined angular position about said axis, which position may be varied by the operation of said manually variable resistor, or to render said manually variable resistor effective to provide a signal controlling the operation of said motor means and to complete said circuit through said second alternate connection whereby said motor means is controlled by the operation of said manually variable resistor and independently of said first variable resistor.

5. A control apparatus for an aircraft having a control surface adapted to change the angular position of an aircraft about an axis and including: motor means operable to position said control surface; means responsive to the angular position of said aircraft about said axis; a first variable resistor controlled by said responsive means; a manually controlled variable resistor; a rebalancing variable resistor controlled by the operation of said motor means; a control circuit of the rebalancing type connected to said motor means to control the operation thereof and including said first variable resistor, said manually controlled variable resistor and said rebalancing resistor, said first resistor being connected in said circuit so as to provide a signal controlling the operation of said motor means in such a manner as to tend to maintain said aircraft in a predetermined angular position about said axis and said manually operated variable resistor being connected to provide a signal causing the operation of said motor means in accordance with the operation of said variable resistor, said circuit having an alternate connection whereby the signals from said first resistor may be omitted from the signals causing the operation of said motor means; and switching means selectively operable to render said manually controlled resistor effective to control the operation of said motor means and connect said motor means to said alternate terminals whereby said first resistor is rendered ineffective to control the operation of said motor means, or to render said manually controlled resistor ineffective and to establish the normal connection to said motor means whereby said first resistor is effective to control the operation of said motor means, or to render said manually controlled resistor effective and to establish normal connection to said motor means whereby said first resistor is effective to cause said motor means to operate to tend to maintain said aircraft in a predetermined angular position about said axis and said manual control means is effective to vary said predetermined angular position, or to render said manually operated control means effective to a reduced degree and to establish said normal connection to said motor means whereby said first control means is effective to operate said motor means so as to tend to maintain said aircraft in a predetermined angular position about said axis and said manually operated means is effective to a reduced degree to vary said predetermined angular position.

6. A control apparatus for an aircraft having first and second control surfaces adapted to change the angular position of the aircraft about a first and second axis respectively, and including: control means associated with each of said control surfaces and including a controller responsive to the angular position of said aircraft about the axis about which said associated control surface is effective, and a manually operated control means, said responsively operated controller being capable of operating said control surface so as to tend to maintain said aircraft in a predetermined angular position about said axis, and said manually operated controller being capable of operating said control surface in accordance with the operation of said controller; and switch means operable to render, in each control means, the responsively operated controller effective and the manually operated controller ineffective to cause the operation of the associated control surface, or to render the responsively operated controller in each said control means effective, the manually operated controller in said control means associated with said first control surface ineffective, and the manually operated controller in said control means associated with said second control surface effective, whereby said second manually operated controller may be operated to vary the predetermined angular position about said second axis which said corresponding responsively operated controller tends to maintain.

7. A control apparatus for an aircraft having first and second control surfaces adapted to change the angular position of the aircraft about a first and second axis respectively, and including: first and second motor means operable to change the position of said first and second control surfaces respectively; motor control means for each of said motor means, each said motor control means including a controller responsive to the angular position of said aircraft about the axis about which said associated control surface is effective, and a manually operated control means, said responsively operated controller being capable of operating said motor means so as to tend to maintain said aircraft in a predetermined angular position about said axis, and said manually operated controller being capable of operating said motor means in accordance with the operation of said controller; and switch means selectively operable to render, in each motor control means, the responsively operated controller effective and the manually operated controller ineffective to cause the operation of the associated motor means, or to render the responsively operated controller in each said motor control means effective, the manuallly operated controller in said motor control means associated with said first motor means ineffective, and the manually operated controller in said motor control means associated with said second motor means effective, whereby said second manually operated controller may be operated to vary the predetermined angular position about said second axis which said corresponding responsively operated controller tends to maintain.

8. A control apparatus for an aircraft having first and second control surfaces adapted to change the angular position of the aircraft about a first and second axis respectively, and including: control means associated with each of said control surfaces and including a controller responsive to the angular position of said aircraft about the axis about which said associated control surface is effective, and a manually operated control means, said responsively operated controller being capable of operating said control surface so as to tend to maintain said aircraft in a predetermined angular position about said axis, and said manually operated controller being capable of operating said control surface in accordance with the operation of said controller; and switching means operable to render the responsively operated controller and the manually operated controller in each said control means effective to cause the operation of the associated control surface, whereby said manually operated controllers may be operated to vary the predetermined angular positions which said responsively operated controllers tend to maintain, or to render the responsively operated controller in each said control means effective, the manually operated controller in said control means associated with said first control surface ineffective, and the manuallly operated controller in said control means associated with said second control surface effective, whereby said second manually operated controller may be operated to vary the predetermined angular position about said second axis which said corresponding responsively operated controller tends to maintain.

9. A control apparatus for an aircraft having first and second control surfaces adapted to change the angular position of the aircraft about a first and second axis respectively, and including: first and second motor means operable to change the position of said first and second control surfaces respectively; motor control means for each of said motor means, each said motor control means including a controller responsive to the angular position of said aircraft about the axis about which said associated control surface is effective, and a manually operated control means, said responsively operated controller being capable of operating said motor means so as to tend to maintain said aircraft in a predetermined angular position about said axis, and said manually operated controller being capable of operating said motor means in accordance with the operation of said controller; and switching means selectively operable to render the responsively operated controller and the manually operated controller in each said motor control means effective to cause the operation of the associated motor means, whereby said manually operated controllers may be operated to vary the predetermined angular positions which said responsively operated controllers tend to maintain, or to render the responsively operated controller in each said motor control means effective, the manually operated controller in said motor control means associated with said first motor means ineffective, and the manually operated controller in said motor control means associated with said second motor means effective, whereby said second manually operated controller may be operated to vary the predetermined angular position about said second axis which said corresponding responsively operated controller tends to maintain.

10. A control apparatus for an aircraft having first and second control surfaces adapted to change the angular position of the aircraft about a first and second axis respectively, and including: control means associated with each of said control surfaces and including a controller responsive to the angular position of said aircraft about the axis about which said associated control surface is effective, and a manually operated control means, said responsively operated controller being capable of operating said control surface so as to tend to maintain said aircraft in a predetermined angular position about said axis, and said manually operated controller being capable of operating said control surface in accordance with the operation of said controller; and switching means operable to render, in each control means, the manually operated controller effective and the responsively operated controller ineffective to cause the operation of the associated control surface, or to render the responsively operated controller in each said control means effective, the manually operated controller in said control means associated with said first control surface ineffective, and the manually operated controller in said control means associated with said second control surface effective, whereby said second manually operated controller may be operated to vary the predetermined angular position about said second axis which said corresponding responsively operated controller tends to maintain.

11. A control apparatus for an aircraft having first and second control surfaces adapted to change the angular position of the aircraft about a first and second axis respectively, and including: first and second motor means operable to change the position of said first and second control surfaces respectively; motor control means for each of said motor means, each said motor control means including a controller responsive to the angular position of said aircraft about the axis about which said associated control surface is effective, and a manually operated control means, said responsively operated controller being capable of operating said motor means so as to tend to maintain said aircraft in a predetermined angular position about said axis, and said manually operated controller being capable of operating said motor means in accordance with the operation of said controller; and switching means selectively operable to render, in each motor control means, the manually operated controller effective and the responsively operated controller ineffective to cause the operation of the associated motor means, or to render the responsively operated controller in each said motor control means effective, the manually operated controller in said motor control means associated with said first motor means ineffective, and the manually operated controller in said motor control means associated with said second motor means effective, whereby said second manually operated controller may be operated to vary the predetermined angular position about said second axis which said corresponding responsively operated controller tends to maintain.

12. A control apparatus for an aircraft having first and second control surfaces adapted to change the angular position of the aircraft about a first and second axis respectively, and including: control means associated with each of said control surfaces and including a controller responsive to the angular position of said aircraft about the axis about which said associated control surface is effective, and a manually operated control means, said responsively operated controller being capable of operating said control surface so as to tend to maintain said aircraft in a predetermined angular position about said axis, and said manually operated controller being capable of operating said control surface in accordance with the operation of said controller; and switching means operable to render, in each control means, the responsively operated controller effective and the manually operated controller ineffective to cause the operation of the associated control surface, or to render the responsively operated controller and the manually operated controller in each control means effective to cause the operation of the associated control surface, whereby said manually operated controllers may be operated to vary the predetermined angular positions which said responsively operated controllers tend to maintain, or to render the responsively operated controller in each said control means effective, the manually operated controller in said control means associated with said first control surface ineffective, and the manually operated controller in said control means associated with said second control surface effective, whereby said second manually operated controller may be operated to vary the predetermined angular position about said second axis which said corresponding responsively operated controller tends to maintain.

13. A control apparatus for an aircraft having first and second control surfaces adapted to change the angular position of the aircraft about a first and second axis respectively, and including: first and second motor means operable to change the position of said first and second control surfaces respectively; motor control means for each of said motor means, each said motor control means including a controller responsive to the angular position of said aircraft about the axis about which said associated control surface is effective, and a manually operated control means, said responsively operated controller being capable of operating said motor means so as to tend to maintain said aircraft in a predetermined angular position about said axis, and said manually operated controller being capable of operating said motor means in accordance with the operation of said controller; and switching means selectively operable to render, in each motor control means, the responsively operated controller effective and the manually operated controller ineffective to cause the operation of the associated motor means, or to render the responsively operated controller and the manually operated controller in each motor control means effective to cause the operation of the associated motor means whereby said manually operated controllers may be operated to vary the predetermined angular positions which said responsively operated controllers tend to maintain, or to render the responsively operated controller in each said motor control means effective, the manually operated controller in said motor control means associated with said first motor means ineffective, and the manually operated controller in said motor control means associated with said second motor means effective, whereby said second manually operated controller may be operated to vary the predetermined angular position about said second axis which said corresponding responsively operated controller tends to maintain.

14. Control apparatus for an aircraft having first and second control surfaces adapted to change the angular position of the aircraft about a first and second axis respectively, and including: control means associated with each of said control surfaces and including a controller responsive to the angular position of said aircraft about the axis about which said associated control surface is effective, and a manually operated control means, said responsively operated controller being capable of operating said control surface so as to tend to maintain said aircraft in a predetermined angular position about said axis, and said manually operated controller being capable of operating said control surface in accordance with the operation of said controller; and switching means operable to render, in each control means, the responsively operated controller effective and the manually operated controller ineffective to cause the operation of the associated control surface, or to render, in each control means, the manually operated controller effective and the responsively operated controller ineffective to cause the operation of the associated control surface, or to render the responsively operated controller in each said control means effective, the manually operated controller in said control means associated with said first control surface ineffective, and the manually operated controller in said control means associated with said second control surface effective, whereby said second manually operated controller may be operated to vary the predetermined angular position about said second axis which said corresponding responsively operated controller tends to maintain.

15. Control apparatus for an aircraft having first and second control surfaces adapted to change the angular position of the aircraft about a first and second axis respectively, and including: first and second motor means operable to change the position of said first and second control surfaces respectively; motor control means for each of said motor means, each said motor control means including a controller responsive to the angular position of said aircraft about the axis about which said associated control surface is effective, and a manually operated control means, said responsively operated controller being capable of operating said motor means so as to tend to maintain said aircraft in a predetermined angular position about said axis, and said manually operated controller being capable of operating said motor means in accordance with the operation of said controller; and switching means selectively operable to render, in each motor control means, the responsively operated controller effective and the manually operated controller ineffective to cause the operation of the associated motor means or to render, in each motor control means, the manually operated controller effective and the responsively operated controller ineffective to cause the operation of the associated motor means, or to render the responsively operated controller in each said motor control means effective, the manually operated controller in said motor control means associated with said first motor means ineffective, and the manually operated controller in said motor control means associated with said second motor means effective, whereby said second manually operated controller may be operated to vary the predetermined angular position about said second axis which said corresponding responsively operated controller tends to maintain.

16. Control apparatus for an aircraft having first and second control surfaces adapted to change the angular position of the aircraft about a first and second axis respectively, and including: control means associated with each of said control surfaces and including a controller responsive to the angular position of said aircraft about the axis about which said associated control surface is effective, and a manually operated control means, said responsively operated controller being capable of operating said control surface so as to tend to maintain said aircraft in a predetermined angular position about said axis, and said manually operated controller being capable of operating said control surface in accordance with the operation of said controller; and switching means operable to render the responsively operated controller and manually operated controller in each control means effective to cause the operation of the associated control surface, whereby said manually operated controllers may be operated to vary the predetermined angular positions which said responsively operated controllers tend to maintain, or to render, in each control means, the manually operated controller effective and the responsively operated controller ineffective to cause the operation of the associated control surface, or to render the responsively operated controller in each said control means effective, the manually operated controller in said control means associated with said first control surface ineffective, and the manually operated controller in said control means associated with said second control surface effective, whereby said second control means may be operated to vary the predetermined angular position about said second axis which said corresponding responsively operated controller tends to maintain.

17. Control apparatus for an aircraft having first and second control surfaces adapted to change the angular position of the aircraft about a first and second axis respectively, and including: first and second motor means operable to change the position of said first and second control surfaces respectively; motor control means for each of said motor means, each said motor control means including a controller responsive to the angular position of said aircraft about the axis about which said associated control surface is effective, and a manually operated control means, said responsively operated controller being capable of operating said motor means so as to tend to maintain said aircraft in a predetermined angular position about said axis, and said manually operated controller being capable of operating said motor means in accordance with the operation of said controller; and switching means selectively operable to render the responsively operated controller and manually operated controller in each motor control means effective to cause the operation of the associated motor means whereby said manually operated controllers may be operated to vary the predetermined angular positions which said responsively operated controllers tend to maintain, or to render, in each motor control means, the manually operated controller effective and the responsively operated controller ineffective to cause the operation of the associated motor means or to render the responsively operated controller in each said motor control means effective, the manually operated controller in said motor control means associated with said first motor means ineffective, and the manually operated controller in said motor control means associated with said second motor means effective, whereby said second manually operated controller may be operated to vary the predetermined angular position about said second axis which said corresponding responsively operated controller tends to maintain.

18. Control apparatus for an aircraft having first and second control surfaces adapted to change the angular position of the aircraft about a first and second axis respectively, and including: control means associated with each of said control surfaces and including a controller responsive to the angular position of said aircraft about the axis about which said associated control surface is effective, and a manually operated control means, said responsively operated controller being capable of operating said control surface so as to tend to maintain said aircraft in a predetermined angular position about said axis, and said manually operated controller being capable of operating said control surface in accordance with the operation of said controller; and switching means operable to render, in each control means, the responsively operated controller effective and the manually operated controller ineffective to cause the operation of the associated control surface, or to render in each control means, the manually operated controller effective and the responsively operated controller ineffective to cause the operation of the associated control surface, or to render the responsively operated controller and the manually operated controller in each control means effective to cause the operation of the associated control surface whereby said manually operated controllers may be operated to vary the predetermined angular position which said responsively operated controllers tend to maintain, or to render the responsively operated controller in each said control means effective, the manually operated controller in said control means associated with said first control surface ineffective, and the manually operated controller in said control means associated with said second control surface effective; whereby said second manually operated controller may be operated to vary the predetermined angular position about said second axis which said corresponding responsively operated controllers tends to maintain.

19. Control apparatus for an aircraft having first and second control surfaces adapted to change the angular position of the aircraft about a first and second axis respectively, and including: first and second motor means operable to change the position of said first and second control surfaces respectively; motor control means for each of said motor means, each said motor control means including a controller responsive to the angular position of said aircraft about the axis about which said associated control surface is effective, and a manually operated control means, said responsively operated controller being capable of operating said motor means so as to tend to maintain said aircraft in a predetermined angular position about said axis, and said manually operated controller being capable of operating said motor means in accordance with the operation of said controller; and switching means selectively operable to render, in each motor control means, the responsively operated controller effective and the manually operated controller ineffective to cause the operation of the associated motor means, or to render, in each motor control means, the manually operated controller effective and the responsively operated controller ineffective to cause the operation of the associated motor means, or to render the responsively operated controller and the manually operated controller in each motor control means effective to cause the operation of the associated motor means whereby said manually operated controllers may be operated to vary the predetermined angular position which said responsively operated controllers tend to maintain, or to render the responsively operated controller in each said motor control means effective, the manually operated controller in said motor control means associated with said first motor means ineffective, and the manually operated controller in said motor control means associated with said second motor means effective, whereby said second manually operated controller may be operated to vary the predetermined angular position about said second axis which said corresponding responsively operated controller tends to maintain.

20. In a control apparatus, the combination which includes: a first potentiometer having a resistor and a wiper bearing against said resistor, said wiper and a conductor connected to a predetermined point on said resistor forming a pair of output terminals; a voltage source connected to the ends of said resistor of said first potentiometer; a second potentiometer having a resistor and a wiper bearing against said resistor; a third resistor connected between one of said output terminals and said second potentiometer; a fourth resistor connected as a shunt between the other of said output terminals and the connection of said third resistor to said second potentiometer; and switch means operable to make and break said shunt connection from said second potentiometer, through said fourth resistor, to the other of said output terminals, whereby when said switch means breaks said connection, substantially all of the signal from said first potentiometer is transmitted to said second potentiometer; and when said switch means makes said connection, a smaller portion of the signal from said potentiometer is transmitted to said second potentiometer.

21. Control apparatus for an aircraft comprising: power means for controlling the position of the aircraft about an axis; control means for said power means; a control network comprising a plurality of adjustable voltage providing controllers connected in electrical series relation; one controller being operated by means responsive to tilt about an axis and another controller being manually operated; means adapted to connect each controller to a source of supply voltage; means for providing a plurality of pairs of output terminals for said network, one pair of terminals applying the entire network voltage output and another pair applying an intermediate network voltage output; switch means interposed between one ouput terminal of each of said pairs and said control means, and further means for operating said switch means and for disconnecting said manually operable controller from its source of supply, so that in one position of said further means said tilt responsive controller and said manually operable controller control said control means, in a second position of said further means said manual means alone controls said control means and in a third position of said further means said tilt responsive controller alone controls said control means.

22. Control apparatus for an aircraft having a control surface adapted to change the angular position of the aircraft about an axis, said apparatus comprising: power means adapted to position said control surface; operable control means for controlling the operation of said power means, said control means including voltage combining means and including a plurality of adjustable controllers each controller including a transformer comprising a primary and a secondary winding, each controller providing a voltage signal in proportion to its adjustment; gyroscope means responsive to tilt about an axis for adjusting one controller to provide a signal proportional to the tilt about said axis to maintain a desired position of said craft about said axis; manually operable means for adjusting a second controller to vary the desired position to be maintained; operable connections from said power means to a third controller to provide a voltage in accordance with the relative adjustment of the gyroscope and manual controllers; connections from each side of a source of alternating current to the primary winding of said gyroscope and power means controllers; a multiple position switch having an operable arm and a plurality of contacts; a connection from one side of said source of alternating current to the operable arm of said switch; connections from the primary winding of said manual controller to the other side of said alternating current source and to one of the plurality of contacts of said multiple position switch so that when said switch arm engages another contact said manual controller primary winding is disconnected from said alternating current source but when said arm engages said one contact said manual controller primary winding is connected to said alternating current source, all whereby said responsive means adjustable controller and said power means controller maintain the attitude of the aircraft as modified by the manual controller when said arm engages said one contact or said responsive controller and said power means controller may maintain the attitude of the aircraft without manual modification of said attitude when said switch arm engages the other of said switch contacts.

23. Control apparatus for an aircraft having a control surface adapted to change the heading of the aircraft in azimuth, said apparatus comprising: means responsive to the heading of said aircraft in azimuth; control means including a motor means adapted to position said control surface said control means including means responsive to a resultant voltage signal; a balanceable network connected to said control means to apply a voltage thereto and having a manually operated controller and a heading deviation controller, each said controller including a transformer having a primary and a secondary winding, said heading deviation controller maintaining craft heading and having a normal position when said craft has a desired heading in azimuth, said controllers controlling the balance of said network and thus controlling the operation of said control surface; motion transmission means between said heading responsive means and said deviation controller; means in said transmission means controlled by operation of said manual controller and effective to interrupt the operation of said heading deviation controller by said responsive means to permit change in heading to be maintained; connections from a source of alternating voltage to the primary winding of said heading deviation controller; a plurality of ganged multi-position switches; connections from a source of control voltage to one contact of a first multi-position switch; a connection from an arm of said multi-position switch to said interrupting means said connection including a normally open further switch means responsive to the operation of said manual controller; a connection from said source of alternating voltage to an arm of a second of said ganged switches; a connection from the contact of the second ganged switch corresponding to said one contact of said first switch to the primary winding of said manual controller; whereby said ganged switches are operable in one position when their respective arms are disengaged from their recited contacts to disconnect the primary winding of the manual controller from its source of alternating voltage to render said manually operated controller ineffective to control the operation of said control surface and to render said manual controller ineffective to control the interrupting means; or operable in another position of said ganged switches, when their respective arms engage the contacts, when said manually operated controller is displaced from a predetermined position to cause operation of said manual controller to operate said interrupting means and to control said control surface to change heading with said heading deviation controller in its normal position, so as to prevent operation of said heading deviation controller away from said normal position by said responsive means.

24. A control apparatus for an aircraft having a control surface adapted to change the angular position of the aircraft about an axis, said apparatus including: motor means operable to position said control surface; a controller responsive to the angular position of said aircraft about said axis for maintaining a selected craft attitude to said axis; a manually operated controller to change attitude to be maintained by said responsive controller, each controller being adapted to be connected to a source of alternating voltage and to provide a signal variable in phase and magnitude; a control means for operating said motor means having means responsive to a resultant signal connected to said motor means to thereby control the operation thereof; a pair of circuits alternatively selectable and connecting on the one hand said manually operated controller and said responsively operated controller in series to said control means and on the other hand connecting said manually operated controller in series with a resistance to said control means to provide in each case a resultant signal; and means including switching means in said circuits and adapted in one position of said switch means to render both said responsively operated controller and said manually operated controller effective to control the operation of said control means so as to maintain said aircraft in a predetermined angular position about said axis, which predetermined angular position may be varied by operation of said manually operated controller, or in another position of said switch to render said responsively operated controller ineffective and reduce the effective magnitude of the signals produced by said manually operated controller, to operate said control means.

25. Control apparatus for an aircraft having a control surface adapted to change the angular position of the aircraft about a horizontal axis thereof, said apparatus comprising: motor means operable to position said control surface; a controller responsive to the angular position of said aircraft about said axis; a manually operated controller each controller comprising a primary and secondary winding, said primaries being adapted to be energized; a control means including alternatively connectable control circuits, one circuit having said manually operated controller and said responsively operated controller connected in series and said other circuit comprising said manually operated controller alone and said control means being connected to said motor means to control the operation thereof in accordance with the resultant signals provided by said circuits; and means including switching means for effecting the alternative connection and associated with said control means and adapted in one position of said switch means to render both said responsively operated controller and said manually operated controller effective to control the operation of said motor means so as to tend to maintain said aircraft in a predetermined angular position about said axis, which predetermined angular position may be varied by operation of said manually operated controller, or in another position of said switch to render said manually operated controller solely effective to operate said motor means.

ROBERT J. KUTZLER.
THEODORE J. WILSON.

REFERENCES CITED

The following references are of record in the file of this patent:

UNITED STATES PATENTS

| Number | Name | Date |
|---|---|---|
| 1,415,003 | Sperry | May 2, 1922 |
| 1,418,335 | Sperry | June 6, 1922 |
| 1,918,082 | Carlson | July 11, 1933 |
| 2,005,530 | Boykow | June 18, 1935 |
| 2,159,142 | Fischer | May 23, 1939 |
| 2,272,725 | Overbeke | Feb. 10, 1942 |
| 2,387,795 | Isserstedt | Oct. 30, 1945 |
| 2,416,097 | Hansen et al. | Feb. 18, 1947 |
| 2,464,629 | Young | Mar. 15, 1949 |